(12) United States Patent
Ogawa et al.

(10) Patent No.: US 9,062,249 B2
(45) Date of Patent: Jun. 23, 2015

(54) LIQUID CRYSTAL COMPOSITION

(71) Applicant: DIC CORPORATION, Tokyo (JP)

(72) Inventors: Shinji Ogawa, Kitaadachi-gun (JP); Yoshinori Iwashita, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/238,699

(22) PCT Filed: Oct. 5, 2012

(86) PCT No.: PCT/JP2012/075987
§ 371 (c)(1),
(2) Date: Feb. 12, 2014

(87) PCT Pub. No.: WO2013/125088
PCT Pub. Date: Aug. 29, 2013

(65) Prior Publication Data
US 2015/0002773 A1      Jan. 1, 2015

(30) Foreign Application Priority Data

Feb. 24, 2012   (JP) ................ 2012-038713

(51) Int. Cl.
*C09K 19/30*   (2006.01)
*C09K 19/44*   (2006.01)
(Continued)

(52) U.S. Cl.
CPC ............ *C09K 19/3003* (2013.01); *C09K 19/44* (2013.01); *C09K 2019/0448* (2013.01);
(Continued)

(58) Field of Classification Search
CPC ........... C09K 19/12; C09K 2019/0448; C09K 2019/123; C09K 2019/3004; C09K 2019/3009; C09K 2019/301; C09K 19/542; C09K 19/548; C09K 2019/3016; G02F 1/13345; G02F 2001/13712; G02F 1/1343
USPC ........................ 252/299.63, 299.66; 349/133
See application file for complete search history.

(56) References Cited

U.S. PATENT DOCUMENTS 7,351,453 B2 *   4/2008   Ichinose et al. ................ 428/1.1
2008/0193681 A1   8/2008   Klasen-Memmer et al.
(Continued)

FOREIGN PATENT DOCUMENTS

| JP | 06-235925 A | 8/1994 |
|---|---|---|
| JP | 2002-357830 A | 12/2002 |

(Continued)

OTHER PUBLICATIONS

International Search Report dated Oct. 30, 2012, issued in corresponding application No. PCT/JP2012/075987.

*Primary Examiner* — Shean C Wu
(74) *Attorney, Agent, or Firm* — Westerman, Hattori, Daniels & Adrian, LLP

(57) ABSTRACT

The present invention relates to a nematic liquid crystal composition useful as a liquid crystal display material and showing a negative value of dielectric anisotropy ($\Delta\epsilon$), and to a liquid crystal display device using the liquid crystal composition.

The present invention provides a liquid crystal composition which causes little dropping marks during manufacture without degrading characteristics, such as dielectric anisotropy, viscosity, an upper limit temperature of a nematic phase, $\gamma_1$, and the like, and image sticking of a display device.

The liquid crystal display device of the present invention has excellent fast response, the characteristic of causing little image sticking, and the characteristic of causing little dropping marks due to its manufacture, and are thus particularly useful for VA-mode and PSVA-mode liquid crystal display devices for active matrix driving and can be applied to liquid crystal display devices such as liquid crystal TV, a monitor, and the like.

11 Claims, 1 Drawing Sheet

(51) Int. Cl.
*C09K 19/54* (2006.01)
*G02F 1/1334* (2006.01)
*G02F 1/1362* (2006.01)
*C09K 19/04* (2006.01)
*C09K 19/12* (2006.01)
*G02F 1/1333* (2006.01)

(52) U.S. Cl.
CPC ... *C09K2019/123* (2013.01); *C09K 2019/3004* (2013.01); *C09K 2019/3009* (2013.01); *C09K 2019/301* (2013.01); *C09K 2019/3016* (2013.01); *C09K 19/542* (2013.01); *C09K 2019/548* (2013.01); *G02F 1/1334* (2013.01); *G02F 1/1362* (2013.01); *G02F 2001/133397* (2013.01)

(56) References Cited

U.S. PATENT DOCUMENTS

| | | | |
|---|---|---|---|
| 2010/0176341 A1* | 7/2010 | Tanaka et al. | 252/299.61 |
| 2011/0122330 A1* | 5/2011 | Tae et al. | 349/39 |
| 2011/0248216 A1* | 10/2011 | Klasen-Memmer et al. | 252/299.62 |

FOREIGN PATENT DOCUMENTS

| | | |
|---|---|---|
| JP | 2006-58755 A | 3/2006 |
| JP | 2008-535958 A | 9/2008 |
| WO | 2010/084823 A1 | 7/2010 |
| WO | 2010/131600 A1 | 11/2010 |
| WO | 2011/055643 A1 | 5/2011 |

\* cited by examiner

LIQUID CRYSTAL COMPOSITION

TECHNICAL FIELD

The present invention relates to a liquid crystal composition useful as a constituent component for a liquid crystal display device and the like and to a liquid crystal display device.

BACKGROUND ART

Liquid crystal display devices have been used for watches and electronic calculators, various measuring apparatuses, automotive panels, word processors, electronic notebooks, printers, computers, televisions, watches, advertising displays, etc. Typical examples of a liquid crystal display mode include a TN (twisted nematic) mode, a STN (super twisted nematic) mode, a VA (vertical alignment) mode and an IPS (in-plane switching) mode using TFT (thin-film transistor), and the like. Liquid crystal compositions used for these liquid crystal display devices are required to have stability to external factors such as moisture, air, heat, light, and the like, exhibit a liquid crystal phase within as wide a temperature range as possible including room temperature as a center, and have low viscosity and low drive voltage. Further, each of the liquid crystal compositions is composed of several types to several tens types of compounds in order to have optimum values of dielectric anisotropy ($\Delta\epsilon$) and/or refractive index anisotropy ($\Delta n$) for a display device.

A vertical alignment-mode display uses a liquid crystal composition having negative $\Delta\epsilon$ and are widely used for liquid crystal TV and the like. On the other hand, low-voltage driving, fast response, and a wide operating temperature range are required for all driving methods. That is, a large absolute value of positive $\Delta\epsilon$, low viscosity ($\eta$), and a high nematic-isotropic liquid phase transition temperature ($T_{ni}$) are required. Also, in view of setting of $\Delta n \times d$ which is the product of $\Delta n$ and a cell gap (d), it is necessary to adjust $\Delta n$ of a liquid crystal composition within a proper range according to the cell gap. In addition, when a liquid crystal display device is applied to a television or the like, fast response is regarded as important, and thus a liquid crystal composition having low $\gamma_1$ is required.

On the other hand, a practical liquid crystal composition includes several types to several tens types of liquid crystal compounds, and the physical property values are determined by the compounds selected and the contents thereof. Many liquid crystal compounds have already been studied, and the basic physical property values such as liquid crystallinity, birefringence, dielectric anisotropy, and the like of the compounds have been made known, and also the basic physical property values of liquid crystal compositions have been mostly made known. However, with expanding application of liquid crystal display devices, significant changes are found in use methods and manufacturing methods thereof. In order to cope with these changes, it is demanded to optimize characteristics other than basic physical property values which have been known. That is, VA (vertical alignment)-mode and IPS (in-plane switching)-mode liquid crystal display devices using liquid crystal compositions are widely used, and super-sized liquid crystal devices of 50 inches or more are put into practical application and used. With increases in substrate size, instead of a usual vacuum injection method, a one drop fill (ODF) method becomes the mainstream of a method of injecting a liquid crystal composition into a substrate (refer to Patent Literature 1), but when a liquid crystal composition is dropped on a substrate, the problem of degrading display quality by dropping marks is surfaced. Further, for the purpose of achieving fast response by forming pre-tilt angles of liquid crystal materials in liquid crystal display devices, a PS liquid crystal display device (polymer stabilized) and a PSA liquid crystal display device (polymer sustained alignment) have been developed (refer to Patent Literature 2), leaving the above-described problem as a great problem. That is, these liquid crystal display devices are characterized in that a monomer is added to a liquid crystal composition, and the monomer in the composition is cured. Compounds which can be used in liquid crystal compositions for active matrix are specified due to the need to maintain a high voltage holding ratio, and the use of compounds having an ester bond therein is limited. Monomers used in a PAS liquid crystal display device are mainly acrylate-based monomers and are generally compounds having an ester bond therein, and such compounds are generally not used as liquid crystal compounds for active matrix (refer to Patent Literature 3). Such foreign materials induce the occurrence of dropping marks and have the problem of degrading the yield of liquid crystal display devices due to display defects. In addition, when additives such as an antioxidant, a light absorber, and the like are added to a liquid crystal composition, deterioration in yield becomes a problem.

Here, "dropping marks" is defined as a phenomenon that white marks of dropping of a liquid crystal composition appear on the surface of a black display.

There is disclosed a method for suppressing dropping marks, in which a polymerizable compound mixed in a liquid crystal composition is polymerized to form a polymer layer in a liquid crystal layer, thereby suppressing dropping marks occurring in relation to an alignment control film (Patent Literature 3). However, this method has the problem of causing image sticking in a display due to the polymerizable compound added to a liquid crystal, and the effect of suppressing dropping marks is unsatisfactory. Therefore, development of a liquid crystal display device causing little image sticking and dropping marks while maintaining the basic characteristics as a liquid crystal display device has been demanded.

CITATION LIST

Patent Literature

PTL 1: Japanese Unexamined Patent Application Publication No. 6-235925

PTL 2: Japanese Unexamined Patent Application Publication No. 2002-357830

PTL 3: Japanese Unexamined Patent Application Publication No. 2006-058755

SUMMARY OF INVENTION

Technical Problem

A problem to be solved by the invention is to provide a liquid crystal display device causing little dropping marks during manufacture without degrading characteristics as a liquid crystal display device, such as dielectric anisotropy, viscosity, an upper limit temperature of a nematic phase, $\gamma_1$, and the like, and image sticking of a display device.

Solution to Problem

In order to solve the problem, the inventors of the present invention studied configurations of various liquid crystal compositions optimum for manufacturing liquid crystal display devices by a one drop fill method and found that the occurrence of dropping marks in a liquid crystal display device can be suppressed by using specified liquid crystal compounds at a specified mixing ratio, leading to the achievement of the present invention.

The present invention provides a liquid crystal composition and a liquid crystal display device using the liquid crystal composition, the liquid crystal composition constituting a liquid crystal layer and containing 30 to 50% of a compound represented by general formula (I),

[Chem. 1]

(I)

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and A represents a 1,4-phenylene group or a trans-1,4-cyclohexylene group), 5 to 20% of a compound represented by general formula (II),

[Chem. 2]

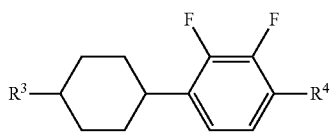

(II-1)

(in the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms), and 25 to 45% of a compound represented by general formula (II-2),

[Chem. 3]

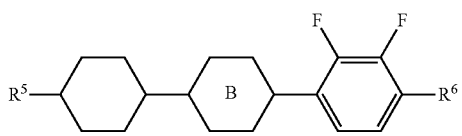

(II-2)

(in the formula, $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, and B represents a 1,4-phenylene group which may be substituted by fluorine or a trans-1,4-cyclohexylene group), and 5 to 20% of a compound represented by general formula (III),

[Chem. 4]

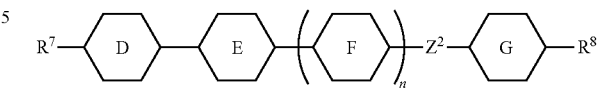

(III)

(in the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, D, E, F, and G each independently represent a 1,4-phenylene group which may be substituted by fluorine or a trans-1,4-cyclohexylene group, $Z^2$ represents a single bond, —OCH$_2$—, —OCO—, —CH$_2$O—, or —COO—, n represents 0 or 1, and when n represents 0, $Z^2$ represents —OCH$_2$—, —OCO—, —CH$_2$O—, or —COO—, or D, E, and G each represent a 1,4-phenylene group which may be substituted by fluorine).

Advantageous Effects of Invention

A liquid crystal display device according to the present invention has excellent fast response, the characteristic of causing little image sticking, and the characteristic of causing little dropping marks due to manufacture, and is thus useful for display devices such as liquid crystal TV, a monitor, and the like.

DESCRIPTION OF EMBODIMENTS

Figure 1:
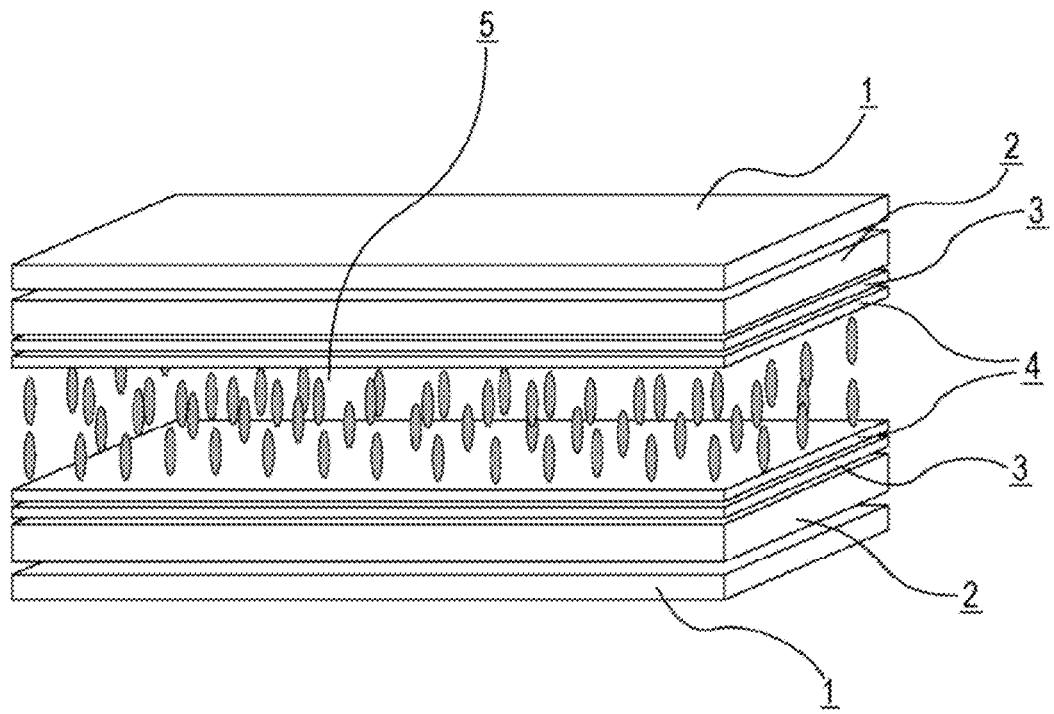
FIG. 1 is a drawing of an example of a structure of a liquid crystal display device according to the present invention.

As described above, at the present time, the process of occurrence of dropping marks is not clear. However, an interaction between impurities in a liquid crystal compound and an alignment film, a chromatographic phenomenon, and the like are highly likely related to dropping marks. Impurities in a liquid crystal compound are greatly influenced by the process for producing the compound, but the process for producing the compound is not necessarily the same as that for a compound different only in number of side chains. That is, a liquid crystal compound is produced by a precise production process, and thus the cost is high among chemical products, leading to the strong demand for improving efficiency of production. Therefore, in order to use raw materials at as low a cost as possible, the efficiency of production may be improved by using a different type of raw material which differs by only 1 in the number of side chains. Therefore, the process for producing a liquid crystal product may be different by product, and even with the same process, raw materials are mostly different, often resulting in contamination of respective products with different impurities. However, dropping marks possibly occur also due to trace amounts of impurities, and thus suppression of the occurrence of dropping marks only by purification of products has limitation.

On the other hand, the method for producing a general-purpose liquid crystal product tends to be determined for each product after the process of production is established. Even at the present when analytical techniques are developed, what impurities are mixed cannot be easily completely determined, but it is necessary to design a composition on the assumption that each product is contaminated with specified impurities. As a result of study on a relation between impurities of liquid crystal products and dropping marks, the inventors empirically found that impurities contained in a composition includes an impurity causing little dropping marks and an impurity easily causing dropping marks. Therefore, it was found that in order to suppress the occurrence of dropping marks, it is important to use a specified compound at a specified mixing ratio, and in particular, a composition causing little dropping marks is present. Preferred embodiments described below were found from the viewpoint described above.

A liquid crystal composition according to the present invention contains 30% to 50% of a compound represented by general formula (I) as a first component, preferably contains 35% to 45%, and more preferably contains 38% to 42%.

In the general formula (I), $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms, more preferably represent an alkyl group having 2 to 5 carbon atoms, an alkenyl group having 2 to 4 carbon atoms, an alkoxy group having 1 to 4 carbon atoms, or an alkenyloxy group having 2 to 4 carbon atoms, and still more preferably represent an alkyl group having 2 or 3 carbon atoms, an alkenyl group having 2 or 3 carbon atoms, an alkoxy group having 1 to 3 carbon atoms, or an alkenyloxy group having 2 or 3 carbon atoms.

$R^1$ preferably represents an alkyl group, but in this case, an alkyl group having 1, 3, or 5 carbon atoms is more preferred, and an alkyl group having 3 carbon atoms is particularly preferred.

$R^1$ and $R^2$ may be the same or different, but preferably different from each other, and when $R^1$ and $R^2$ are both alkyl groups, alkyl groups having different numbers 1, 3, or 5 of carbon atoms are particularly preferred.

The content of a compound represented by the general formula (I) in which at least one of substituents $R^1$ and $R^2$ is an alkyl group having 3 to 5 carbon atoms is preferably 50% or more, more preferably 70% or more, and still more preferably 80% or more, in compounds represented by the general formula (I). In addition, the content of a compound represented by the general formula (I) in which at least one of substituents $R^1$ and $R^2$ is an alkyl group having 3 carbon atoms is preferably 50% or more, more preferably 70% or more, still more preferably 80% or more, and most preferably 100%, in compounds represented by the general formula (I).

A represents a 1,4-phenylene group or a trans-1,4-cyclohexylene group, and preferably represents a trans-1,4-cyclohexylene group. The content of a compound represented by the general formula (I) in which A represents a trans-1,4-cyclohexylene group is preferably 50% or more, more preferably 70% or more, and still more preferably 80% or more, in compounds represented by the general formula (I). The content of a compound represented by the general formula (I) in which B represents a trans-1,4-cyclohexylene group is preferably 10% or more, more preferably 12% or more, and still more preferably 15% or more, in compounds represented by the general formula (I).

In addition, at least one each of compounds in which A in the general formula (I) represents a 1,4-phenylene group and a trans-1,4-cyclohexylene group, respectively, is preferably contained.

Preferred examples of compounds represented by the general formula (I) include compounds represented by general formula (Ia) to general formula (Ik) below.

[Chem. 5]

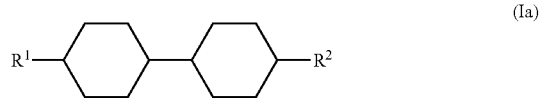
(Ia)

(Ib)

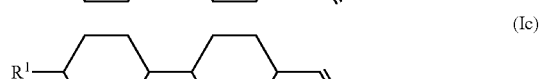
(Ic)

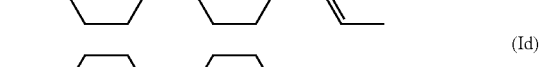
(Id)

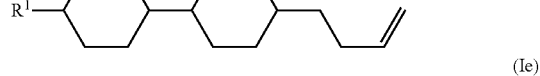
(Ie)

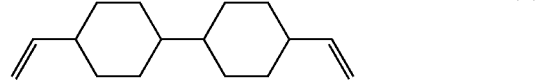
(If)

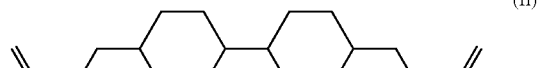
(Ig)

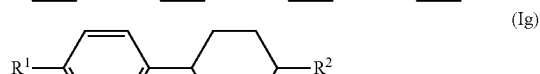
(Ih)

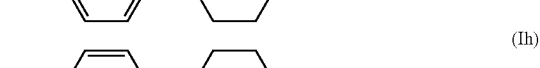
(Ij)

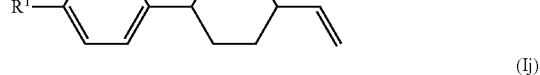
(Ik)

(In the formulae, $R^1$ and $R^2$ each independently represent an alkyl group having 1 to 5 carbon atoms or an alkoxy group having 1 to 5 carbon atoms, but $R^1$ and $R^2$ preferably include the same examples as those in the general formula (I).)

Of the general formula (Ia) to general formula (Ik), the general formula (Ia), the general formula (Ib), and the general formula (Ig) are preferred, the general formula (Ia) and the general formula (Ig) are more preferred, and the general formula (Ia) is particularly preferred. When a response speed is regarded as important, the general formula (Ib) is also preferred, and when a response speed is regarded as important, the general formula (Ib), the general formula (Ie), the general formula (If), and the general formula (Ih) are more preferred. When a response speed is regarded as important, dialkenyl compounds of the general formula (Ie) and the general formula (If) are particularly preferred.

In view of these points, the content of compounds represented by the general formula (Ia) and the general formula (Ig) is preferably 50% or more, more preferably 70% or more, still more preferably 80% or more, and most preferably 100%, in compounds represented by the general formula (I). In addition, the content of a compound represented by the general formula (Ia) is preferably 50% or more, more preferably 70% or more, and still more preferably 80% or more, in compounds represented by the general formula (I). The liquid crystal composition contains 5% to 20% of a compound represented by general formula (II-1) as a second component, preferably contains 10% to 15%, and more preferably contains 12% to 14%.

In the general formula (II-1), $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, still more preferably represents an alkyl group having 3 to 5 carbon atoms or an alkenyl group having 2 carbon atoms, and particularly preferably represents an alkyl group having 3 carbon atoms.

$R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, preferably represents an alkyl group having 1 to 5 carbon atoms or an alkoxy group having 1 to 5 carbon atoms, more preferably represents an alkyl group having 1 to 3 carbon atoms or an alkoxy group having 1 to 3 carbon atoms, still more preferably represents an alkyl group having 3 carbon atoms or an alkoxy group having 2 carbon atoms, and particularly preferably represents an alkoxy group having 2 carbon atoms.

Preferred examples of compounds represented by the general formula (II-1) include compounds represented by general formula (II-1a) and general formula (II-1b) below.

[Chem. 6]

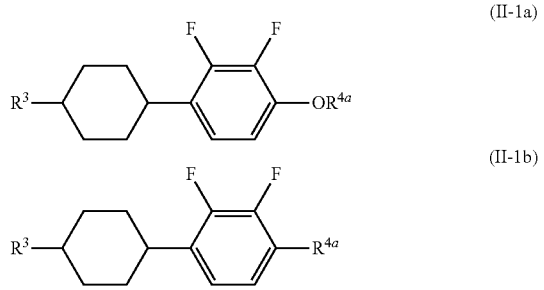

(In the formulae, $R^3$ represents an alkyl group having 1 to 5 carbon atoms or an alkenyl group having 2 to 5 carbon atoms, and $R^{4a}$ represents an alkyl group having 1 to 5 carbon atoms.)

In the general formula (II-1a), $R^3$ preferably includes the same examples as those in the general formula (II-1). $R^{4a}$ is an alkyl group having 1 to 3 carbon atoms, more preferably an alkyl group having 1 or 2 carbon atoms, and particularly preferably an alkyl group having 2 carbon atoms.

In the general formula (II-1b), $R^3$ preferably includes the same examples as in the general formula (II-1). $R^{4a}$ is an alkyl group having 1 to 3 carbon atoms, more preferably an alkyl group having 1 or 3 carbon atoms, and particularly preferably an alkyl group having 3 carbon atoms.

Of the general formula (II-1a) and the general formula (II-1b), the general formula (II-1a) is preferred for increasing an absolute value of dielectric anisotropy.

The liquid crystal composition contains 25% to 45% of a compound represented by general formula (II-2) as a third component, preferably contains 30% to 40%, and more preferably contains 31% to 36%.

In the general formula (II-2), $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, still more preferably represents an alkyl group having 3 to 5 carbon atoms or an alkenyl group having 2 carbon atoms, and particularly preferably represents an alkyl group having 3 carbon atoms.

$R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, preferably represents an alkyl group having 1 to 5 carbon atoms or an alkoxy group having 1 to 5 carbon atoms, more preferably represents an alkyl group having 1 to 3 carbon atoms or an alkoxy group having 1 to 3 carbon atoms, still more preferably represents an alkyl group having 3 carbon atoms or an alkoxy group having 2 carbon atoms, and particularly preferably represents an alkoxy group having 2 carbon atoms.

B represents a 1,4-phenylene group which may be substituted by fluorine or a trans-1,4-cyclohexylene group, but an unsubstituted 1,4-phenylene group or a trans-1,4-cyclohexylene group is preferred, and a trans-1,4-cyclohexylene group is more preferred.

Preferred examples of compounds represented by the general formula (II-2) include compounds represented by general formula (II-2a) to general formula (II-2d) below.

[Chem. 7]

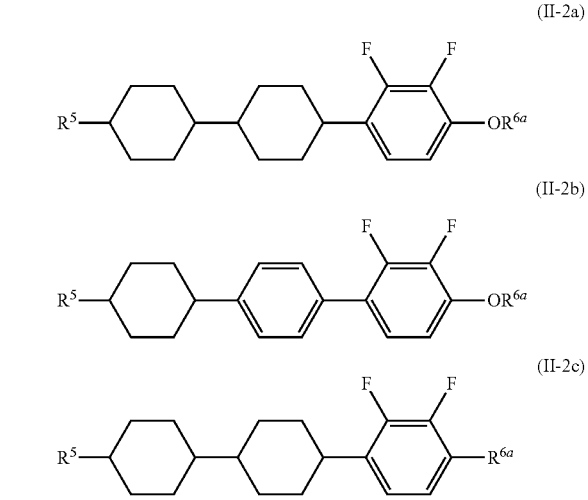

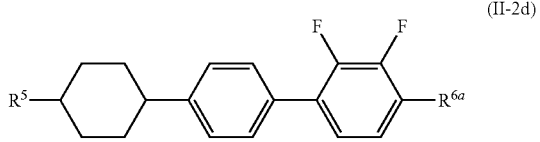

(In the formulae, R⁵ represents an alkyl group having 1 to 5 carbon atoms or an alkenyl group having 2 to 5 carbon atoms, and R⁶ᵃ represents an alkyl group having 1 to 5 carbon atoms. However, R⁵ and R⁶ᵃ preferably include the same examples as those of R⁵ and R⁶ in the general formula (II-2).)

In the general formula (II-2a) and general formula (II-2b), R⁵ preferably includes the same examples as in the general formula (II-2). R⁶ᵃ is preferably an alkyl group having 1 to 3 carbon atoms, more preferably an alkyl group having 1 or 2 carbon atoms, and particularly preferably an alkyl group having 2 carbon atoms.

In the general formula (II-2c) and general formula (II-2d), R⁵ preferably includes the same examples as in the general formula (II-2). R⁶ᵃ is preferably an alkyl group having 1 to 3 carbon atoms, more preferably an alkyl group having 1 or 3 carbon atoms, and particularly preferably an alkyl group having 3 carbon atoms.

Of the general formula (II-1a) and the general formula (II-1b), the general formula (II-1a) is preferred for increasing an absolute value of dielectric anisotropy.

At least one each of a compound in which B in the general formula (II-2) represents a 1,4-phenylene group and a compound in which B in the general formula (II-2) represents a trans-1,4-cyclohexylene group is preferably contained.

The liquid crystal composition contains 5% to 20% of a compound represented by general formula (III) as a fourth component, preferably contains 8% to 15%, and more preferably contains 10% to 13%.

In the general formula (III), R⁷ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

When D represents a trans-1,4-cyclohexylene group, R⁷ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, still more preferably represents an alkyl group having 3 to 5 carbon atoms or an alkenyl group having 2 carbon atoms, and particularly preferably represents an alkyl group having 3 carbon atoms.

When D represents a 1,4-phenylene group which may be substituted by fluorine, R⁷ preferably represents an alkyl group having 1 to 5 carbon atoms or an alkenyl group having 4 or 5 carbon atoms, more preferably represents an alkyl group having 2 to 5 carbon atoms or an alkenyl group having 4 carbon atoms, and still more preferably represents an alkyl group having 2 to 4 carbon atoms.

R⁸ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms.

When G represents a trans-1,4-cyclohexylene group, R⁸ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, still more preferably represents an alkyl group having 3 to 5 carbon atoms or an alkenyl group having 2 carbon atoms, and particularly preferably represents an alkyl group having 3 carbon atoms.

When G represents a 1,4-phenylene group which may be substituted by fluorine, R⁸ preferably represents an alkyl group having 1 to 5 carbon atoms or an alkenyl group having 4 or 5 carbon atoms, more preferably represents an alkyl group having 2 to 5 carbon atoms or an alkenyl group having 4 carbon atoms, and still more preferably represents an alkyl group having 2 to 4 carbon atoms.

When R⁷ and R⁸ each represent an alkenyl group and bonded D or G represents a 1,4-phenylene group which may be substituted by fluorine, an alkenyl group having 4 or 5 carbon atoms preferably has a structure below.

[Chem. 8]

(In the formulae, a ring structure is bonded to the right end.)
Also in this case, an alkenyl group having 4 carbon atoms is more preferred.

D, E, F, and G each independently represent a 1,4-phenylene group which may be substituted or a trans-1,4-cyclohexylene group, preferably represent a 2-fluoro-1,4-phenylene group, a 2,3-difluoro-1,4-phenylene group, a 1,4-phenylene group, or a trans-1,4-cyclohexylene group, more preferably represent a 2-fluoro-1,4-phenylene group, a 2,3-difluoro-1,4-phenylene group, or a 1,4-phenylene group, and particularly preferably represent a 2,3-difluoro-1,4-phenylene group or a 1,4-phenylene group.

Z² represents a single bond, —OCH₂—, —OCO—, —CH₂O—, or —COO—, preferably represents a single bond, —CH₂O—, or —COO—, and more preferably represents a single bond.

n represents 0 or 1, and when Z² represents a substituent other than a single bond, n preferably represents 0.

Preferred examples of compounds represented by the general formula (III) in which n represents 0 include compounds represented by general formula (III-1a) to general formula (III-1h) below.

[Chem. 9]

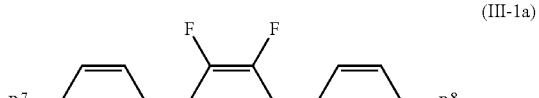
(III-1a)

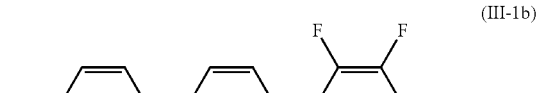
(III-1b)

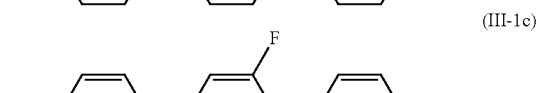
(III-1c)

-continued

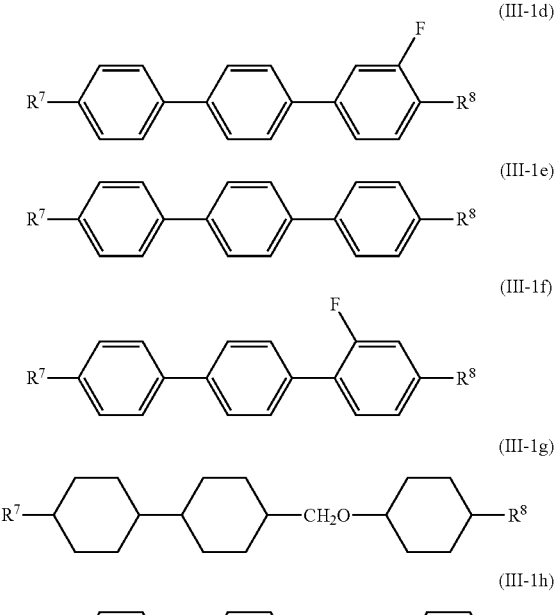

(In the formulae, $R^7$ and $R^8$ each independently represent an alkyl group having 1 to 5 carbon atoms, an alkenyl group having 2 to 5 carbon atoms, or an alkoxy group having 1 to 5 carbon atoms, but $R^7$ and $R^8$ preferably include the same examples as those in the general formula (III).)

Preferred examples of compounds represented by the general formula (III) in which n represents 1 include compounds represented by general formula (III-2a) to general formula (III-2l) below.

[Chem. 10]

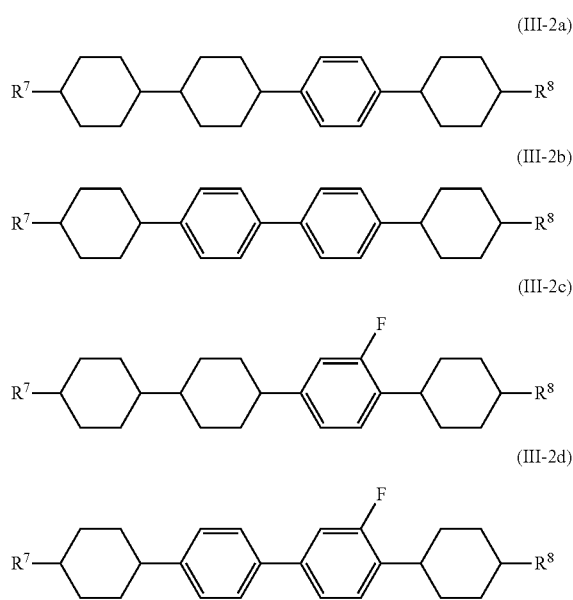

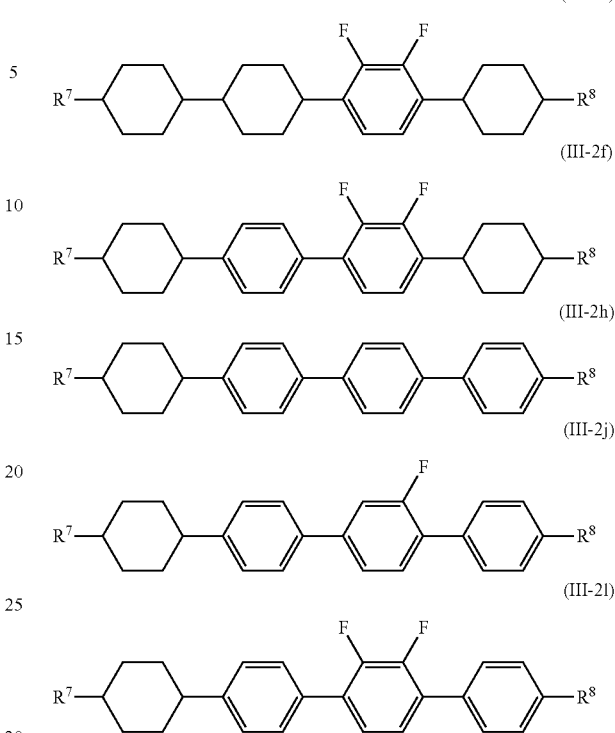

(In the formulae, $R^7$ and $R^8$ each independently represent an alkyl group having 1 to 5 carbon atoms, an alkenyl group having 2 to 5 carbon atoms, or an alkoxy group having 1 to 5 carbon atoms, but $R^7$ and $R^8$ preferably include the same examples as those in the general formula (III).)

The liquid crystal composition of the present invention includes a combination of compounds represented by the general formula (I) to the general formula (III), and the compounds in a combination preferably have contents below.

Compounds represented by the general formula (II-1) and the general formula (II-2) are both compounds having negative dielectric anisotropy and a relatively large absolute value thereof, and a total content of the compounds is preferably 30% to 65%, more preferably 40% to 55%, and particularly preferably 43% to 50%.

Compounds represented by the general formula (III) include a compound having positive dielectric anisotropy and a compound having negative dielectric anisotropy, and when a compound having negative dielectric anisotropy and an absolute value of 0.3 or more is used, a total content of compounds represented by the general formula (II-1) the general formula (II-2), and the general formula (III) is preferably 35% to 70%, more preferably 45% to 65%, and particularly preferably 50% to 60%.

The composition preferably contains 30% to 50%, more preferably 35% to 45%, and particularly preferably 38% to 42%, of a compound represented by the general formula (I), and 35% to 70%, 45% to 65%, and particularly preferably 50% to 60%, of compounds represented by the general formula (II-1) the general formula (II-2), and the general formula (III).

A total content of compounds represented by the general formula (I), the general formula (II-1) the general formula (II-2), and the general formula (III) is preferably 80% to 100%, more preferably 90% to 100%, and particularly preferably 95% to 100%.

Although the nematic-isotropic liquid phase transition temperature ($T_{ni}$) of the liquid crystal composition of the present invention can be used over a wide range, the nematic-isotropic liquid phase transition temperature ($T_{ni}$) is preferably 60° C. to 120° C., more preferably 70° C. to 100° C., and particularly preferably 70° C. to 85° C.

The dielectric anisotropy at 25° C. is preferably −2.0 to −6.0, more preferably −2.5 to −5.0, and particularly preferably −2.5 to −3.5.

The refractive index anisotropy at 25° C. is preferably 0.08 to 0.13 and more preferably 0.09 to 0.12. In further detail, in response to a thin cell gap, the refractive index anisotropy at 25° C. is preferably 0.10 to 0.12, whine in response to a thick cell gap, the refractive index anisotropy at 25° C. is preferably 0.08 to 0.10.

The rotational viscosity (γ1) is preferably 150 or less, more preferably 130 or less, and particularly preferably 120 or less.

The liquid crystal composition of the present invention preferably shows a specified value of Z which is a function of rotational viscosity and refractive index anisotropy.

$$Z = \gamma 1 / \Delta n^2 \qquad \text{[Math. 1]}$$

(In the equation, γ1 represents rotational viscosity, and Δn represents refractive index anisotropy.)

Z is preferably 13000 or less, more preferably 12000 or less, and particularly preferably 11000 or less.

When the liquid crystal composition of the present invention is used for an active matrix display device, it is necessary for the liquid crystal composition to have a resistivity of $10^{12}$ (Ω·m) or more, preferably $10^{13}$ (Ω·m) or more, and more preferably $10^{14}$ (Ω·m) or more.

Besides the above-described compounds, the liquid crystal composition of the present invention may contain usual nematic liquid crystal, smectic liquid crystal, cholesteric liquid crystal, antioxidant, ultraviolet absorber, polymerizable monomer, etc.

The polymerizable monomer is preferably a difunctional monomer represented by general formula (V),

[Chem. 11]

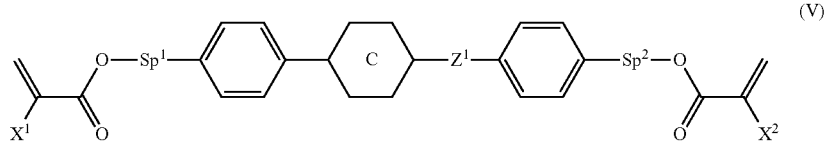

(V)

(in the formula, $X^1$ and $X^2$ each independently represent a hydrogen atom or a methyl group,
$Sp^1$ and $Sp^2$ each independently represent a single bond, an alkylene group having 1 to 8 carbon atoms, or —O—$(CH_2)_s$— (wherein s represents an integer of 2 to 7, and an oxygen atom is bonded to an aromatic ring),
$Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1=CY^2$— (wherein $Y^1$ and $Y^2$ each independently represent a fluorine atom or a hydrogen atom), —C≡C—, or a single bond,
C represents a 1,4-phenylene group, a trans-1,4-cyclohexylene group, or a single bond, and any hydrogen atom of all 1,4-phenylene groups in the formula may be substituted by a fluorine atom.)

Either a diacrylate derivative in which $X^1$ and $X^2$ both represent hydrogen atoms or a dimethacrylate derivative in which $X^1$ and $X^2$ both represent methyl groups is preferred, and a compound in which one of $X^1$ and $X^2$ represents a hydrogen atom, and the other represents a methyl group is also preferred. Among these compounds, the diacrylate derivative has the highest polymerization rate, the dimethacrylate derivative has a lower polymerization rate, and an asymmetric compound has a medium polymerization rate between them. A preferred form can be used according to application. The dimethacrylate derivative is particularly preferred for a PSA display device.

$Sp^1$ and $Sp^2$ each independently represent a single bond, an alkylene group having 1 to 8 carbon atoms, or —O—$(CH_2)_s$—, but at least one of $Sp^1$ and $Sp^2$ is preferably a single bond for a PSA display device. Specifically, a compound in which $Sp^1$ and $Sp^2$ both represent single bonds or a form in which one represents a single bond, and the other represents an alkylene group having 1 to 8 carbon atoms, or —O—$(CH_2)_s$— is preferred. In this case, a 1-4 alkyl group is preferred, and s is preferably 1 to 4.

$Z^1$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, and particularly preferably a single bond.

C represents a 1,4-phenylene group in which any hydrogen atom may be substituted by a fluorine atom, a trans-1,4-cyclohexylene group, or a single bond, but a 1,4-phenylene group or a single bond is preferred. When C represents a ring structure other than a single bond, $Z^1$ is also preferably a linkage group other than a single bond, and when C is a single bond, $Z^1$ is preferably a single bond.

In view of the above, specifically, a ring structure between $Sp^1$ and $Sp^2$ in the general formula (V) is preferably a structure described below,
in the general formula (V), when C represents a single bond, and the ring structure includes two rings, the ring structure is preferably represented by formula (Va-1) to formula (Va-5), more preferably represented by formula (Va-1) to formula (Va-3), and particularly preferably represented by formula (Va-1),

[Chem. 12]

(Va-1)

(Va-2)

-continued

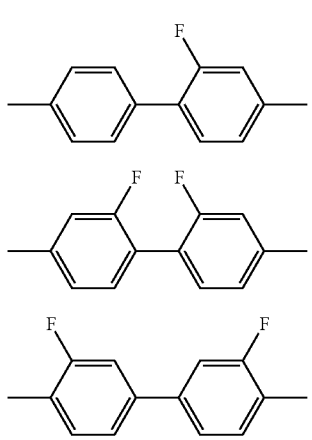

(Va-3)

(Va-4)

(Va-5)

(in the formulae, each end is bonded to $Sp^1$ or $Sp^2$).

A polymerizable compound having such a skeleton has, after polymerization, alignment regulating force optimum for a PSA-type liquid crystal display device, and thus a good alignment state can be achieved, thereby suppressing display unevenness or causing no display unevenness.

In view of the above, polymerizable monomers of general formula (V-1) to general formula (V-4) are particularly preferred, and general formula (V-2) is most preferred.

[Chem. 13]

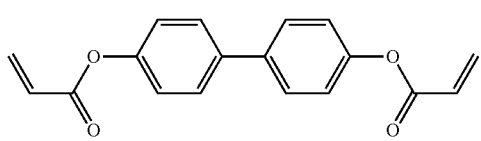

(V-1)

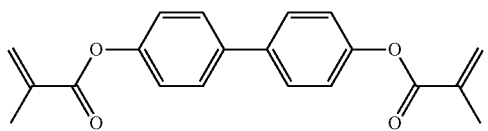

(V-2)

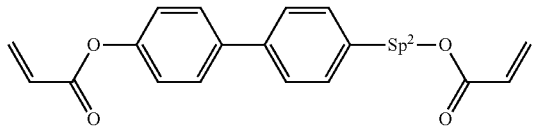

(V-3)

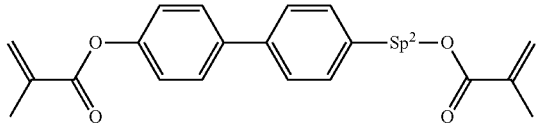

(V-4)

(In the formulae, $Sp^2$ represents an alkylene group having 2 to 5 carbon atoms.)

When the monomer is added to the liquid crystal composition of the present invention, polymerization proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like. Also, a stabilizer may be added for improving storage stability. Examples of the stabilizer which can be used include hydroquinones, hydroquinone monoalkyl ethers, tertiary butyl catechols, pyrogallols, thiophenols, nitro compounds, β-naphthylamines, β-naphthols, nitroso compounds, and the like.

The liquid crystal composition containing the polymerizable compound of the present invention is useful for liquid crystal display devices, particularly useful for liquid crystal display devices for active matrix driving, and can be used for liquid crystal display devices of a PSA-mode, PSVA-mode, VA-mode, IPS-mode, or ECB-mode.

The liquid crystal composition containing the polymerizable compound of the present invention is imparted with a liquid crystal alignment ability when the polymerizable compound contained is polymerized by irradiation with ultraviolet light, and is used for a liquid crystal display device in which a quantity of light transmitted is controlled by using birefringence of the liquid crystal composition. The liquid crystal composition is useful for liquid crystal display devices, such as AM-LCD (active matrix liquid crystal display device), TN (nematic liquid crystal display device), STN-LCD (super twisted nematic liquid crystal display device), OCB-LCD, and IPS-LCD (in-plane switching liquid crystal display device), particularly useful for AM-LCD, and can be used for transmissive or reflective liquid crystal display devices.

Two substrates of a liquid crystal cell used in a liquid crystal display device can be formed by using a transparent material with flexibility, such as glass or plastic, and one of the two substrates may be made of an opaque material such as silicon or the like. A transparent substrate including a transparent electrode layer can be formed by sputtering indium tin oxide (ITO) on a transparent substrate such as a glass plate or the like.

A color filter can be formed by, for example, a pigment dispersion method, a printing method, an electrodeposition method, a dyeing method, or the like. The method for forming a color filter by the pigment dispersion method is described as an example. A curable colored composition for a color filter is applied on the transparent substrate, patterned, and then cured by heating or light irradiation. This process is performed for each of the three colors of red, green, and blue, thereby forming a pixel portion for a color filter. In addition, a pixel electrode provided with an active element such as TFT, a thin-film diode, a metal-insulator-metal resistivity element, or the like may be installed on the substrate.

The substrates are opposed to each other so that the transparent electrode layers face inward. In this case, the gap between the substrates may be adjusted through a spacer. The resulting light control layer is preferably adjusted to have a thickness of 1 to 100 μm. The thickness is more preferably 1.5 to 10 μm, and when a polarizing plate is used, the product of refractive index anisotropy Δn of a liquid crystal and cell thickness d is preferably adjusted to maximize contrast. When two polarizing plates are used, an angle of view and contrast can be improved by adjusting the polarizing axis of each of the polarizing plates. Further, a phase difference film can be used for widening the angle of view. Examples of the spacer include glass particles, plastic particles, alumina particles, a photoresist material, and the like. Then, a sealing agent such as an epoxy-based heat-curable composition or the like is screen-printed in a form having a liquid crystal inlet on each of the substrates, the substrates are bonded together, and then the sealing agent is thermally cured by heating.

A usual vacuum injection method or ODF method can be used as a method for holding the liquid crystal composition containing the polymerizable compound between the substrates, but the vacuum injection method has the problem of leaving injection marks, in spite of causing no dropping marks. However, the present invention can preferably use the ODF method in a process for manufacturing a liquid crystal display device.

Since an appropriate polymerization rate is desired for achieving good liquid crystal-aligning performance, a preferred method of polymerizing the polymerizable compound is a polymerization method in which the compound is polymerized by irradiation with one or two or more of active energy rays such as ultraviolet light, electron beams, and the like, or by sequential irradiation with these active energy rays. When ultraviolet light is used, either a polarized light source or an unpolarized light source may be used. When the liquid crystal composition containing the polymerizable compound is polymerized in a state of being held between the two substrates, at least the substrate on the irradiation surface side must be imparted with proper transparency to the active energy rays. In addition, another method may be used, in which only a specified portion is polymerized by using a mask during light irradiation, and then the alignment state of an unpolymerized portion is changed by changing a condition such as an electric field, a magnetic field, or a temperature, followed by further polymerization by irradiation with active energy rays. In particular, ultraviolet exposure is preferably performed by applying an alternating-current electric field to the liquid crystal composition containing the polymerizable compound. The alternating-current electric field is preferably applied with an alternating current at a frequency of 10 Hz to 10 kHz, more preferably a frequency of 60 Hz to 10 kHz, and a voltage selected depending on a desired pre-tilt angle of the liquid crystal display device. That is, the pre-tilt angle of the liquid crystal display device can be controlled by the voltage applied. In a MVA-mode liquid crystal display device, the pre-tilt angle is preferably controlled to 80 degrees to 89.9 degrees from the viewpoint of alignment stability and contrast.

The temperature during irradiation preferably falls in a temperature range in which the liquid crystal state of the liquid crystal composition of the present invention can be maintained. Polymerization is preferably performed at a temperature close to room temperature, typically a temperature of 15° C. to 35° C. A metal halide lamp, a high-pressure mercury lamp, a superhigh-pressure mercury lamp, or the like can be used a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light is preferably 0.1 mW/cm$^2$ to 100 W/cm$^2$ and more preferably 2 mW/cm$^2$ to 50 W/cm$^2$. A quantity of irradiating ultraviolet light energy can be appropriately adjusted, but it is preferably 10 mJ/cm$^2$ to 500 J/cm$^2$, and more preferably 100 mJ/cm$^2$ to 200 J/cm$^2$. During ultraviolet irradiation, the intensity may be changed. The time required for ultraviolet irradiation is appropriately selected according to the intensity of irradiating ultraviolet light, but is preferably 10 seconds to 3600 seconds and more preferably 10 seconds to 600 seconds.

As shown in FIG. 1, a liquid crystal display device of the present invention includes a first substrate provided with a common electrode composed of a transparent conductive material, a second substrate provided with a pixel electrode composed of a transparent conductive material and a thin-film transistor which controls the pixel electrode provided for each pixel, and a liquid crystal composition held between the first substrate and the second substrate, and liquid crystal molecules in the liquid crystal composition are aligned substantially perpendicularly to the substrates with no voltage applied, the liquid crystal composition of the present invention being used as the liquid crystal composition.

The occurrence of dropping marks is greatly influenced by the liquid crystal material injected, but also inevitably influenced by the configuration of a display device. In particular, a color filter, a thin-film transistor, and the like formed in a liquid crystal display device are separated from the liquid crystal composition only by members such as a thin alignment film, a transparent electrode, and the like, and thus the occurrence of dropping marks is influenced by combination of these members.

In particular, when the thin-film transistor is of an inversely staggered type, a drain electrode tends to be increased in area because the drain electrode is formed to cover a gate electrode. The drain electrode is composed of a metallic material such as copper, aluminum, chromium, titanium, molybdenum, tantalum, or the like, and generally has a usual form of being passivated. However, both a protective film and an alignment film are thin and highly likely not to cur off ionic materials, and the occurrence of dropping marks due to an interaction between the metallic material and the liquid crystal composition cannot be avoided.

Figure 2:
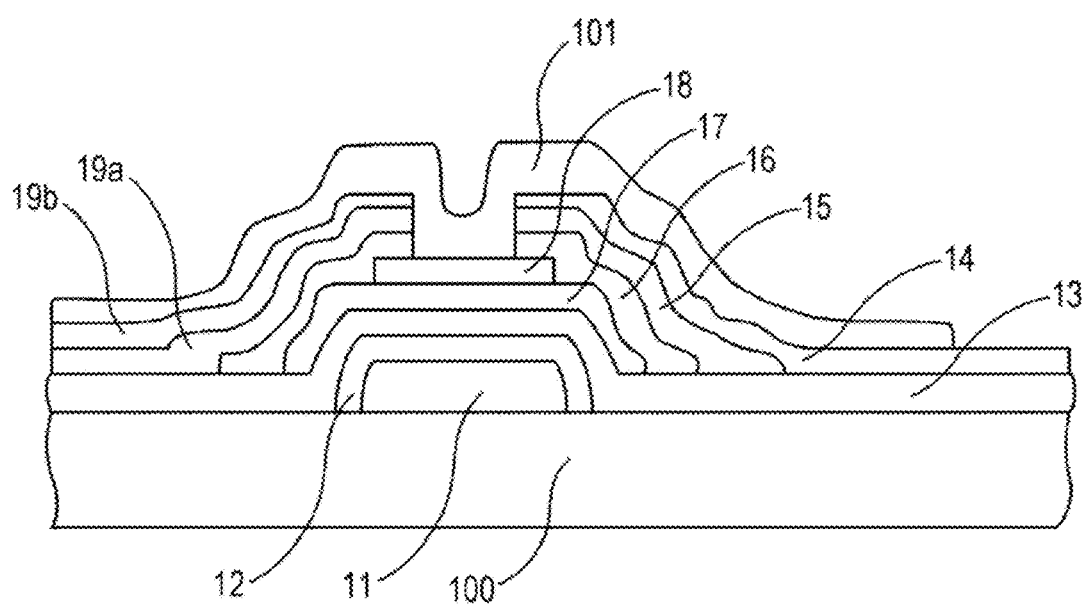
FIG. 2 is a drawing of an example of a configuration of an inversely staggered thin-film transistor.

The present invention can be preferably used for a liquid crystal display device in which a thin-film transistor is an inversely staggered type as shown in FIG. 2, and aluminum wiring is preferably used.

A liquid crystal display device using the liquid crystal composition of the present invention is useful, particularly useful for a liquid crystal display device for active matrix driving, because both fast response and suppression of display defects are achieved, and the liquid crystal display device can be applied to a liquid crystal display device for a VA mode, a PSVA mode, a PSA mode, an IPS mode, or an ECB mode.

EXAMPLES

The present invention is described in further detail below by way of examples, but the present invention is not limited to these examples. In the examples and comparative examples below, "%" in a composition represents "% by mass".

The characteristics measured in the examples are as follows.

$T_{ni}$: nematic-isotropic liquid phase transition temperature (° C.)

Δn: refractive index anisotropy at 25° C.

Δε: dielectric anisotropy at 25° C.

η: viscosity at 20° C. (mPa·s)

$γ_1$: rotational viscosity at 25° C. (mPa·s)

Image Sticking:

Image sticking of a liquid crystal display device was evaluated by display of a predetermined fixed pattern within a display area for 1000 hours and then uniform display over the entire screen to visually observe the level of residual image of the fixed pattern based on the following 4 levels:

A: No residual image
B: Slight residual image at an allowable level
C: Residual image at an unallowable level
D: Significant residual image Dropping Marks:

Dropping marks of a liquid crystal display device were evaluated by visually observing white dropping marks appearing on the surface of a full black display based on the following 4 levels:

A: No residual image
B: Slight residual image at an allowable level
C: Residual image at an unallowable level
D: Significant residual image In the examples, compounds are described by using abbreviations below.

(Side Chain)

-n —$C_nH_{2n+1}$ linear alkyl group having n carbon atoms

-On —$OC_nH_{2n+1}$ linear alkoxy group having n carbon atoms (Ring Structure)

[Chem. 14]

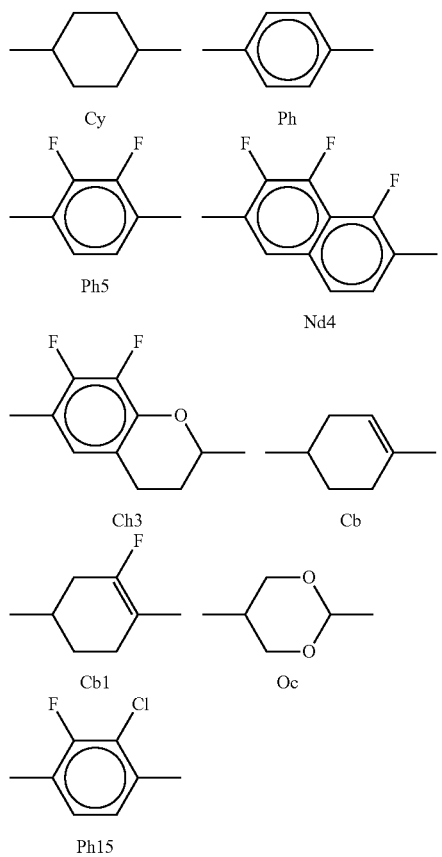

Example 1

A liquid crystal composition having a composition described below was prepared, and physical property values thereof were measured. The results are shown in a table below.

A VA liquid crystal display device shown in FIG. 1 was formed using the liquid crystal composition of Example 1. The liquid crystal display device included an inversely staggered thin-film transistor serving as an active element. The liquid crystal composition was injected by an one drop fill method, and image sticking and dropping marks were evaluated.

A symbol written on the right side of a content represents an abbreviation of a compound.

[Chem. 15]

Example 1

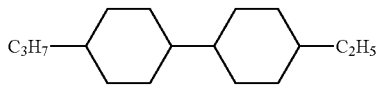
24% 3CyCy2

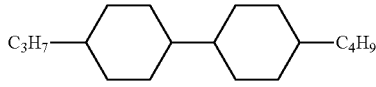
10% 3CyCy4

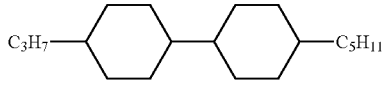
5% 3CyCy5

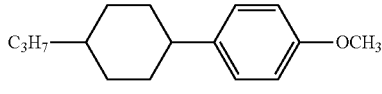
2% 3CyPhO1

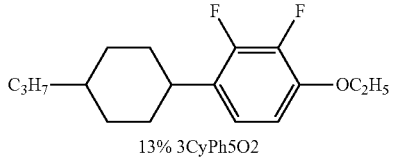
13% 3CyPh5O2

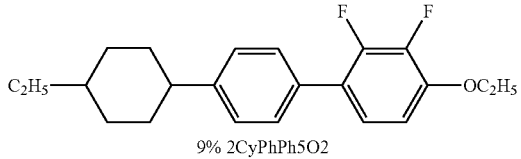
9% 2CyPhPh5O2

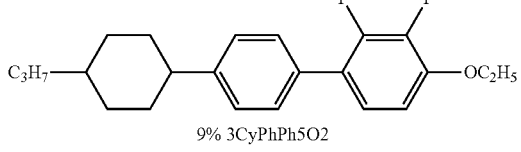
9% 3CyPhPh5O2

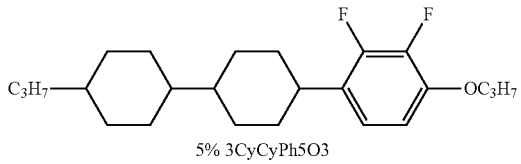
5% 3CyCyPh5O3

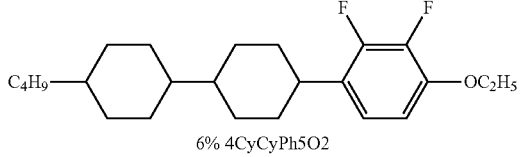
6% 4CyCyPh5O2

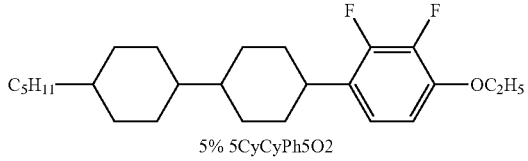
5% 5CyCyPh5O2

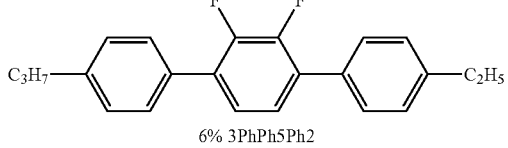
6% 3PhPh5Ph2

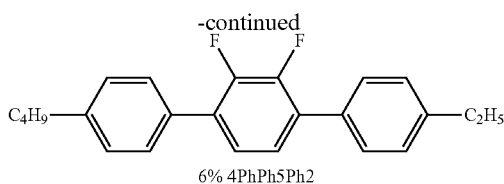

6% 4PhPh5Ph2

TABLE 1

| | |
|---|---|
| $T_{NI}/°C.$ | 81.0 |
| $\Delta n$ | 0.103 |
| no | 1.483 |
| $\epsilon_{//}$ | 3.3 |
| $\epsilon_{\perp}$ | 6.2 |
| $\Delta \epsilon$ | −2.9 |
| $\eta/mPa \cdot s$ | 20.3 |
| $\gamma_1/mPa \cdot s$ | 112 |
| $\gamma_1/\Delta n^2 \times 10^{-2}$ | 105 |
| Evaluation of dropping marks | A |
| Evaluation of image sticking | A |

It is found that the liquid crystal composition of Example 1 has a liquid crystal layer temperature range of 81° C. which is practical as a TV liquid crystal composition, a large absolute value of dielectric anisotropy, low viscosity, and optimum Δn. The VA liquid crystal display device shown in FIG. 1 and manufactured by using the liquid crystal composition of Example 1 were measured with respect to image sticking and dropping marks by the above-described methods. The measurement showed excellent evaluation results as shown in Table 1.

Examples 2 and 3

Liquid crystal compositions having compositions described below were prepared, and physical property values thereof were measured. The results are shown in a table below.

A VA liquid crystal display device was manufactured by same method as in Example 1 using the liquid crystal composition of each of Examples 2 and 3 and evaluated with respect to image sticking and dropping marks. The evaluation showed excellent results as shown in the table below.

TABLE 2

| | Example 2 | | Example 3 | |
|---|---|---|---|---|
| $T_{NI}/°C.$ | 76.0 | $T_{NI}/°C.$ | 84.8 | |
| $\Delta n$ | 0.103 | $\Delta n$ | 0.103 | |
| no | 1.484 | no | 1.484 | |
| $\epsilon_{//}$ | 3.3 | $\epsilon_{//}$ | 3.2 | |
| $\epsilon_{\perp}$ | 6.3 | $\epsilon_{\perp}$ | 6.1 | |
| $\Delta \epsilon$ | −2.9 | $\Delta \epsilon$ | −2.9 | |
| $\eta/mPa \cdot s$ | 19.8 | $\eta/mPa \cdot s$ | 21.4 | |
| $\gamma_1/mPa \cdot s$ | 110 | $\gamma_1/mPa \cdot s$ | 119 | |
| $\gamma_1/\Delta n^2 \times 10^{-2}$ | 103 | $\gamma_1/\Delta n^2 \times 10^{-2}$ | 112 | |
| 3CyCy2 | 24% | 3CyCy2 | 24% | |
| 3CyCy4 | 10% | 3CyCy4 | 11% | |
| 3CyPhO1 | 7% | 3CyPh5O2 | 12% | |
| 3CyPh5O2 | 14% | 2CyPhPh5O2 | 5% | |
| 2CyPhPh5O2 | 7% | 3CyPhPh5O2 | 6% | |
| 3CyPhPh5O2 | 9% | 3CyCyPh5O3 | 8% | |
| 3CyCyPh5O3 | 5% | 4CyCyPh5O2 | 8% | |
| 4CyCyPh5O2 | 7% | 5CyCyPh5O2 | 8% | |
| 5CyCyPh5O2 | 5% | 3PhPh5Ph2 | 6% | |
| 3PhPh5Ph2 | 6% | 4PhPh5Ph2 | 6% | |
| 4PhPh5Ph2 | 6% | 5PhPh1 | 3% | |
| Evaluation of dropping marks | A | 3CyCyPh1 | 3% | |
| Evaluation of image sticking | A | Evaluation of dropping marks | A | |
| | | Evaluation of image sticking | A | |

Examples 4 to 6

Liquid crystal compositions having compositions described below were prepared, and physical property values thereof were measured. The results are shown in a table below.

A VA liquid crystal display device was manufactured by same method as in Example 1 using the liquid crystal composition of each of Examples 4 and 6 and evaluated with respect to image sticking and dropping marks. The evaluation showed excellent results as shown in the table below.

TABLE 3

| | Example 4 | | Example 5 |
|---|---|---|---|
| $T_{NI}/°C.$ | 74.9 | $T_{NI}/°C.$ | 80.2 |
| $\Delta n$ | 0.102 | $\Delta n$ | 0.105 |
| no | 1.484 | no | 1.485 |
| $\epsilon_{//}$ | 3.2 | $\epsilon_{//}$ | 3.2 |
| $\epsilon_{\perp}$ | 6.1 | $\epsilon_{\perp}$ | 6.1 |
| $\Delta \epsilon$ | −2.9 | $\Delta \epsilon$ | −2.9 |
| $\eta/mPa \cdot s$ | 21.1 | $\eta/mPa \cdot s$ | 22.7 |
| $\gamma_1/mPa \cdot s$ | 116 | $\gamma_1/mPa \cdot s$ | 124 |
| $\gamma_1/\Delta n^2 \times 10^{-2}$ | 111 | $\gamma_1/\Delta n^2 \times 10^{-2}$ | 112 |
| 3CyCy2 | 22% | 3CyCy2 | 20% |
| 3CyCy4 | 11% | 3CyCy4 | 10% |
| 3CyPh5O2 | 7% | 3CyPh5O2 | 7% |
| 3CyPh5O4 | 8% | 3CyPh5O4 | 7% |
| 2CyPhPh5O2 | 6% | 2CyPhPh5O2 | 6% |
| 3CyPhPh5O2 | 7% | 3CyPhPh5O2 | 7% |
| 3CyCyPh5O3 | 7% | 3CyCyPh5O3 | 7% |
| 4CyCyPh5O2 | 7% | 4CyCyPh5O2 | 8% |
| 5CyCyPh5O2 | 7% | 5CyCyPh5O2 | 7% |
| 3PhPh5Ph2 | 4% | 3PhPh5Ph2 | 4% |
| 4PhPh5Ph2 | 4% | 4PhPh5Ph2 | 4% |
| 5PhPh1 | 8% | 5PhPh1 | 8% |
| 3CyCyPh1 | 2% | 3CyCyPh1 | 5% |
| Evaluation of dropping marks | B | Evaluation of dropping marks | B |
| Evaluation of image sticking | B | Evaluation of image sticking | B |

| | Example 6 | |
|---|---|---|
| $T_{NI}/°C.$ | | 85.7 |
| $\Delta n$ | | 0.104 |
| no | | 1.484 |
| $\epsilon_{//}$ | | 3.2 |
| $\epsilon_{\perp}$ | | 6.1 |
| $\Delta \epsilon$ | | −3.0 |
| $\eta/mPa \cdot s$ | | 22.9 |
| $\gamma_1/mPa \cdot s$ | | 126 |
| $\gamma_1/\Delta n^2 \times 10^{-2}$ | | 116 |
| 3CyCy2 | | 20% |
| 3CyCy4 | | 10% |
| 3CyPh5O2 | | 7% |
| 3CyPh5O4 | | 7% |
| 2CyPhPh5O2 | | 6% |
| 3CyPhPh5O2 | | 7% |
| 3CyCyPh5O3 | | 7% |
| 4CyCyPh5O2 | | 8% |
| 5CyCyPh5O2 | | 7% |
| 3PhPh5Ph2 | | 4% |
| 4PhPh5Ph2 | | 4% |
| 5PhPh1 | | 5% |
| 3CyCyPh1 | | 8% |

TABLE 3-continued

| | |
|---|---|
| Evaluation of dropping marks | B |
| Evaluation of image sticking | B |

Examples 7 to 9

Liquid crystal compositions having compositions described below were prepared, and physical property values thereof were measured. The results are shown in a table below.

A VA liquid crystal display device was manufactured by same method as in Example 1 using the liquid crystal composition of each of Examples 7 and 9 and evaluated with respect to image sticking and dropping marks. The evaluation showed excellent results as shown in the table below.

TABLE 4

| | Example 7 | | Example 8 |
|---|---|---|---|
| $T_{NI}/°$ C. | 75.1 | $T_{NI}/°$ C. | 80.4 |
| $\Delta n$ | 0.103 | $\Delta n$ | 0.103 |
| no | 1.484 | no | 1.485 |
| $\epsilon_{//}$ | 3.3 | $\epsilon_{//}$ | 3.3 |
| $\epsilon_{\perp}$ | 5.9 | $\epsilon_{\perp}$ | 5.9 |
| $\Delta\epsilon$ | −2.6 | $\Delta\epsilon$ | −2.6 |
| $\eta/mPa \cdot s$ | 20.5 | $\eta/mPa \cdot s$ | 21.6 |
| $\gamma_1/mPa \cdot s$ | 117 | $\gamma_1/mPa \cdot s$ | 125 |
| $\gamma_1/\Delta n^2 \times 10^{-2}$ | 110 | $\gamma_1/\Delta n^2 \times 10^{-2}$ | 117 |
| 3CyCy2 | 15% | 3CyCy2 | 15% |
| 3CyCy4 | 12% | 3CyCy4 | 12% |
| 3CyCy5 | 7% | 3CyCy5 | 7% |
| 3CyPhO1 | 12% | 3CyPhO1 | 12% |
| 3CyPh5O2 | 6% | 3CyPh5O2 | 5% |
| 3CyPh5O4 | 7% | 3CyPh5O4 | 5% |
| 2CyPhPh5O2 | 11% | 2CyPhPh5O2 | 11% |
| 3CyPhPh5O2 | 12% | 3CyPhPh5O2 | 11% |
| 3CyCyPh5O3 | 3% | 3CyCyPh5O3 | 4% |
| 4CyCyPh5O2 | 4% | 4CyCyPh5O2 | 6% |
| 5CyCyPh5O2 | 3% | 5CyCyPh5O2 | 4% |
| 3PhPh5Ph2 | 4% | 3PhPh5Ph2 | 4% |
| 4PhPh5Ph2 | 4% | 4PhPh5Ph2 | 4% |
| Evaluation of dropping marks | B | Evaluation of dropping marks | B |
| Evaluation of image sticking | B | Evaluation of image sticking | B |

| | Example 9 | |
|---|---|---|
| | $T_{NI}/°$ C. | 85.1 |
| | $\Delta n$ | 0.103 |
| | no | 1.484 |
| | $\epsilon_{//}$ | 3.2 |
| | $\epsilon_{\perp}$ | 5.8 |
| | $\Delta\epsilon$ | −2.6 |
| | $\eta/mPa \cdot s$ | 22.7 |
| | $\gamma_1/mPa \cdot s$ | 130 |
| | $\gamma_1/\Delta n^2 \times 10^{-2}$ | 122 |
| | 3CyCy2 | 10% |
| | 3CyCy4 | 15% |
| | 3CyCy5 | 12% |
| | 3CyPhO1 | 9% |
| | 3CyPh5O2 | 5% |
| | 3CyPh5O4 | 5% |
| | 2CyPhPh5O2 | 11% |
| | 3CyPhPh5O2 | 11% |
| | 3CyCyPh5O3 | 4% |
| | 4CyCyPh5O2 | 6% |
| | 5CyCyPh5O2 | 4% |
| | 3PhPh5Ph2 | 4% |
| | 4PhPh5Ph2 | 4% |
| | Evaluation of dropping marks | B |

TABLE 4-continued

| | |
|---|---|
| Evaluation of image sticking | B |

Examples 10 to 12

Liquid crystal compositions having compositions described below were prepared, and physical property values thereof were measured. The results are shown in a table below.

A VA liquid crystal display device was manufactured by same method as in Example 1 using the liquid crystal composition of each of Examples 10 and 12 and evaluated with respect to image sticking and dropping marks. The evaluation showed excellent results as shown in the table below.

TABLE 5

| Example 10 | | Example 11 | |
|---|---|---|---|
| $T_{NI}/°$ C. | 76.6 | $T_{NI}/°$ C. | 80.2 |
| $\Delta n$ | 0.106 | $\Delta n$ | 0.102 |
| no | 1.487 | no | 1.485 |
| $\epsilon_{//}$ | 3.3 | $\epsilon_{//}$ | 3.2 |
| $\epsilon_{\perp}$ | 5.8 | $\epsilon_{\perp}$ | 5.8 |
| $\Delta\epsilon$ | −2.6 | $\Delta\epsilon$ | −2.6 |
| $\eta/mPa \cdot s$ | 22.7 | $\eta/mPa \cdot s$ | 22.0 |
| $\gamma_1/mPa \cdot s$ | 134 | $\gamma_1/mPa \cdot s$ | 129 |
| $\gamma_1/\Delta n^2 \times 10^{-2}$ | 119 | $\gamma_1/\Delta n^2 \times 10^{-2}$ | 124 |
| 3CyCy2 | 24% | 3CyCy2 | 24% |
| 3CyCy4 | 6% | 3CyCy4 | 10% |
| 3CyPhO1 | 5% | 3CyPhO1 | 4% |
| 3CyPh5O4 | 9% | 3CyPh5O4 | 9% |
| 2CyPhPh5O2 | 8% | 2CyPhPh5O2 | 8% |
| 3CyPhPh5O2 | 8% | 3CyPhPh5O2 | 8% |
| 3CyCyPh5O3 | 7% | 3CyCyPh5O3 | 7% |
| 4CyCyPh5O2 | 9% | 4CyCyPh5O2 | 9% |
| 5CyCyPh5O2 | 7% | 5CyCyPh5O2 | 7% |
| 3PhPh5Ph2 | 4% | 3PhPh5Ph2 | 4% |
| 4PhPh5Ph2 | 4% | 4PhPh5Ph2 | 4% |
| 5PhPh1 | 9% | 5PhPh1 | 6% |
| Evaluation of dropping marks | B | Evaluation of dropping marks | B |
| Evaluation of image sticking | B | Evaluation of image sticking | B |

| Example 12 | |
|---|---|
| $T_{NI}/°$ C. | 85.7 |
| $\Delta n$ | 0.101 |
| no | 1.484 |
| $\epsilon_{//}$ | 3.2 |
| $\epsilon_{\perp}$ | 5.9 |
| $\Delta\epsilon$ | −2.7 |
| $\eta/mPa \cdot s$ | 22.2 |
| $\gamma_1/mPa \cdot s$ | 131 |
| $\gamma_1/\Delta n^2 \times 10^{-2}$ | 128 |
| 3CyCy2 | 24% |
| 3CyCy4 | 10% |
| 3CyPhO1 | 4% |
| 3CyPh5O4 | 9% |
| 2CyPhPh5O2 | 8% |
| 3CyPhPh5O2 | 8% |
| 3CyCyPh5O3 | 7% |
| 4CyCyPh5O2 | 9% |
| 5CyCyPh5O2 | 7% |
| 3PhPh5Ph2 | 4% |
| 4PhPh5Ph2 | 4% |
| 5PhPh1 | 3% |
| 3CyCyPh1 | 3% |
| Evaluation of dropping marks | B |
| Evaluation of image sticking | B |

Examples 13 to 15

Liquid crystal compositions having compositions described below were prepared, and physical property values thereof were measured. The results are shown in a table below.

A VA liquid crystal display device was manufactured by same method as in Example 1 using the liquid crystal composition of each of Examples 13 and 15 and evaluated with respect to image sticking and dropping marks. The evaluation showed excellent results as shown in the table below.

TABLE 6

| Example 13 | | Example 14 | |
|---|---|---|---|
| $T_{NI}/°C$ | 75.3 | $T_{NI}/°C$ | 80.3 |
| $\Delta n$ | 0.105 | $\Delta n$ | 0.106 |
| no | 1.485 | no | 1.486 |
| $\epsilon_{//}$ | 3.3 | $\epsilon_{//}$ | 3.3 |
| $\epsilon_{\perp}$ | 6.2 | $\epsilon_{\perp}$ | 6.2 |
| $\Delta \epsilon$ | −2.9 | $\Delta \epsilon$ | −2.9 |
| $\eta/mPa \cdot s$ | 20.2 | $\eta/mPa \cdot s$ | 21.4 |
| $\gamma_1/mPa \cdot s$ | 113 | $\gamma_1/mPa \cdot s$ | 121 |
| $\gamma_1/\Delta n^2 \times 10^{-2}$ | 103 | $\gamma_1/\Delta n^2 \times 10^{-2}$ | 107 |
| 3CyCy2 | 24% | 3CyCy2 | 23% |
| 3CyCy4 | 5% | 3CyCy4 | 5% |
| 3CyPhO1 | 7% | 3CyPhO1 | 7% |
| 2CyPh5O2 | 9% | 2CyPh5O2 | 8% |
| 3CyPh5O4 | 8% | 3CyPh5O4 | 7% |
| 2CyPhPh5O2 | 7% | 2CyPhPh5O2 | 7% |
| 3CyPhPh5O2 | 9% | 3CyPhPh5O2 | 9% |
| 3CyCyPh5O3 | 5% | 3CyCyPh5O3 | 5% |
| 4CyCyPh5O2 | 5% | 4CyCyPh5O2 | 6% |
| 5CyCyPh5O2 | 4% | 5CyCyPh5O2 | 5% |
| 3PhPh5Ph2 | 5% | 3PhPh5Ph2 | 5% |
| 4PhPh5Ph2 | 6% | 4PhPh5Ph2 | 6% |
| 3CyCyPh1 | 6% | 3CyCyPh1 | 7% |
| Evaluation of dropping marks | B | Evaluation of dropping marks | B |
| Evaluation of image sticking | B | Evaluation of image sticking | B |

| Example 15 | |
|---|---|
| $T_{NI}/°C$ | 85.9 |
| $\Delta n$ | 0.107 |
| no | 1.485 |
| $\epsilon_{//}$ | 3.3 |
| $\epsilon_{\perp}$ | 6.3 |
| $\Delta \epsilon$ | −3.0 |
| $\eta/mPa \cdot s$ | 23.2 |
| $\gamma_1/mPa \cdot s$ | 129 |
| $\gamma_1/\Delta n^2 \times 10^{-2}$ | 114 |
| 3CyCy2 | 16% |
| 3CyCy4 | 9% |
| 3CyCy5 | 3% |
| 3CyPhO1 | 6% |
| 2CyPh5O2 | 8% |
| 3CyPh5O4 | 7% |
| 2CyPhPh5O2 | 7% |
| 3CyPhPh5O2 | 9% |
| 3CyCyPh5O3 | 5% |
| 4CyCyPh5O2 | 6% |
| 5CyCyPh5O2 | 6% |
| 3PhPh5Ph2 | 5% |
| 4PhPh5Ph2 | 5% |
| 3CyCyPh1 | 8% |
| Evaluation of dropping marks | B |
| Evaluation of image sticking | B |

Examples 16 to 18

Liquid crystal compositions having compositions described below were prepared, and physical property values thereof were measured. The results are shown in a table below.

A VA liquid crystal display device was manufactured by same method as in Example 1 using the liquid crystal composition of each of Examples 16 and 18 and evaluated with respect to image sticking and dropping marks. The evaluation showed excellent results as shown in the table below.

TABLE 7

| Example 16 | | Example 17 | |
|---|---|---|---|
| $T_{NI}/°C$ | 76.0 | $T_{NI}/°C$ | 81.3 |
| $\Delta n$ | 0.105 | $\Delta n$ | 0.106 |
| no | 1.484 | no | 1.483 |
| $\epsilon_{//}$ | 3.3 | $\epsilon_{//}$ | 3.2 |
| $\epsilon_{\perp}$ | 6.0 | $\epsilon_{\perp}$ | 6.0 |
| $\Delta \epsilon$ | −2.7 | $\Delta \epsilon$ | −2.8 |
| $\eta/mPa \cdot s$ | 20.6 | $\eta/mPa \cdot s$ | 20.7 |
| $\gamma_1/mPa \cdot s$ | 118 | $\gamma_1/mPa \cdot s$ | 117 |
| $\gamma_1/\Delta n^2 \times 10^{-2}$ | 106 | $\gamma_1/\Delta n^2 \times 10^{-2}$ | 105 |
| 3CyCy2 | 19% | 3CyCy2 | 21% |
| 3CyCy4 | 12% | 3CyCy4 | 12% |
| 3CyCy5 | 5% | 3CyCy5 | 5% |
| 3CyPhO1 | 5% | 2CyPh5O2 | 7% |
| 2CyPh5O2 | 7% | 3CyPh5O4 | 8% |
| 3CyPh5O4 | 8% | 2CyPhPh5O2 | 7% |
| 2CyPhPh5O2 | 7% | 3CyPhPh5O2 | 7% |
| 3CyPhPh5O2 | 7% | 3CyCyPh5O3 | 5% |
| 3CyCyPh5O3 | 5% | 4CyCyPh5O2 | 5% |
| 4CyCyPh5O2 | 5% | 5CyCyPh5O2 | 5% |
| 5CyCyPh5O2 | 5% | 3PhPh5Ph2 | 7% |
| 3PhPh5Ph2 | 7% | 4PhPh5Ph2 | 8% |
| 4PhPh5Ph2 | 8% | 3CyCyPh1 | 3% |
| Evaluation of dropping marks | B | Evaluation of dropping marks | B |
| Evaluation of image sticking | B | Evaluation of image sticking | B |

| Example 18 | |
|---|---|
| $T_{NI}/°C$ | 84.7 |
| $\Delta n$ | 0.108 |
| no | 1.484 |
| $\epsilon_{//}$ | 3.2 |
| $\epsilon_{\perp}$ | 6.0 |
| $\Delta \epsilon$ | −2.8 |
| $\eta/mPa \cdot s$ | 21.7 |
| $\gamma_1/mPa \cdot s$ | 123 |
| $\gamma_1/\Delta n^2 \times 10^{-2}$ | 105 |
| 3CyCy2 | 19% |
| 3CyCy4 | 12% |
| 3CyCy5 | 4% |
| 2CyPh5O2 | 7% |
| 3CyPh5O4 | 8% |
| 2CyPhPh5O2 | 7% |
| 3CyPhPh5O2 | 7% |
| 3CyCyPh5O3 | 5% |
| 4CyCyPh5O2 | 5% |
| 5CyCyPh5O2 | 5% |
| 3PhPh5Ph2 | 7% |
| 4PhPh5Ph2 | 8% |
| 3CyCyPh1 | 6% |
| Evaluation of dropping marks | B |
| Evaluation of image sticking | B |

Examples 19 to 21

Liquid crystal compositions having compositions described below were prepared, and physical property values thereof were measured. The results are shown in a table below.

A VA liquid crystal display device was manufactured by same method as in Example 1 using the liquid crystal composition of each of Examples 19 and 21 and evaluated with respect to image sticking and dropping marks. The evaluation showed excellent results as shown in the table below.

TABLE 8

| | Example 19 | | Example 20 |
|---|---|---|---|
| $T_{NI}/°C$ | 77.1 | $T_{NI}/°C$ | 82.7 |
| $\Delta n$ | 0.104 | $\Delta n$ | 0.107 |
| no | 1.485 | no | 1.486 |
| $\epsilon_{//}$ | 3.5 | $\epsilon_{//}$ | 3.3 |
| $\epsilon_\perp$ | 7.0 | $\epsilon_\perp$ | 6.3 |
| $\Delta\epsilon$ | −3.5 | $\Delta\epsilon$ | −3.0 |
| $\eta/mPa·s$ | 25.1 | $\eta/mPa·s$ | 24.2 |
| $\gamma_1/mPa·s$ | 141 | $\gamma_1/mPa·s$ | 141 |
| $\gamma_1/\Delta n^2 \times 10^{-2}$ | 131 | $\gamma_1/\Delta n^2 \times 10^{-2}$ | 123 |
| 3CyCy2 | 22% | 3CyCy2 | 24% |
| 3CyPhO1 | 14% | 3CyCy4 | 5% |
| 2CyPh5O2 | 7% | 3CyPhO1 | 6% |
| 3CyPh5O4 | 8% | 2CyPh5O2 | 5% |
| 2CyPhPh5O2 | 7% | 3CyPh5O4 | 5% |
| 3CyPhPh5O2 | 9% | 2CyPhPh5O2 | 7% |
| 3CyCyPh5O3 | 8% | 3CyPhPh5O2 | 9% |
| 4CyCyPh5O2 | 9% | 3CyCyPh5O3 | 8% |
| 5CyCyPh5O2 | 8% | 4CyCyPh5O2 | 9% |
| 3PhPh5Ph2 | 4% | 5CyCyPh5O2 | 8% |
| 4PhPh5Ph2 | 4% | 3PhPh5Ph2 | 5% |
| Evaluation of dropping marks | B | 4PhPh5Ph2 | 5% |
| Evaluation of image sticking | B | 5PhPh1 | 4% |
| | | Evaluation of dropping marks | B |
| | | Evaluation of image sticking | B |

| Example 21 | |
|---|---|
| $T_{NI}/°C$ | 86.4 |
| $\Delta n$ | 0.106 |
| no | 1.485 |
| $\epsilon_{//}$ | 3.3 |
| $\epsilon_\perp$ | 6.3 |
| $\Delta\epsilon$ | −3.0 |
| $\eta/mPa·s$ | 24.4 |
| $\gamma_1/mPa·s$ | 142 |
| $\gamma_1/\Delta n^2 \times 10^{-2}$ | 126 |
| 3CyCy2 | 24% |
| 3CyCy4 | 5% |
| 3CyPhO1 | 6% |
| 2CyPh5O2 | 5% |
| 3CyPh5O4 | 5% |
| 2CyPhPh5O2 | 7% |
| 3CyPhPh5O2 | 9% |
| 3CyCyPh5O3 | 8% |
| 4CyCyPh5O2 | 9% |
| 5CyCyPh5O2 | 8% |
| 3PhPh5Ph2 | 5% |
| 4PhPh5Ph2 | 5% |
| 5PhPh1 | 2% |
| 3CyCyPh1 | 2% |
| Evaluation of dropping marks | B |
| Evaluation of image sticking | B |

Examples 22 to 24

Liquid crystal compositions having compositions described below were prepared, and physical property values thereof were measured. The results are shown in a table below.

A VA liquid crystal display device was manufactured by same method as in Example 1 using the liquid crystal composition of each of Examples 22 and 24 and evaluated with respect to image sticking and dropping marks. The evaluation showed excellent results as shown in the table below.

TABLE 9

| | Example 22 | | Example 23 |
|---|---|---|---|
| $T_{NI}/°C$ | 75.5 | $T_{NI}/°C$ | 80.3 |
| $\Delta n$ | 0.102 | $\Delta n$ | 0.101 |
| no | 1.484 | no | 1.484 |
| $\epsilon_{//}$ | 3.3 | $\epsilon_{//}$ | 3.3 |
| $\epsilon_\perp$ | 6.1 | $\epsilon_\perp$ | 6.2 |
| $\Delta\epsilon$ | −2.8 | $\Delta\epsilon$ | −2.9 |
| $\eta/mPa·s$ | 22.2 | $\eta/mPa·s$ | 22.0 |
| $\gamma_1/mPa·s$ | 121 | $\gamma_1/mPa·s$ | 118 |
| $\gamma_1/\Delta n^2 \times 10^{-2}$ | 117 | $\gamma_1/\Delta n^2 \times 10^{-2}$ | 117 |
| 3CyCy2 | 14% | 3CyCy2 | 17% |
| 3CyCy4 | 12% | 3CyCy4 | 12% |
| 3CyCy5 | 5% | 3CyCy5 | 5% |
| 3CyPhO1 | 7% | 3CyPhO1 | 6% |
| 2CyPh5O2 | 7% | 2CyPh5O2 | 12% |
| 3CyPh5O4 | 7% | 2CyPhPh5O2 | 9% |
| 2CyPhPh5O2 | 8% | 3CyPhPh5O2 | 9% |
| 3CyPhPh5O2 | 8% | 3CyCyPh5O3 | 6% |
| 3CyCyPh5O3 | 6% | 4CyCyPh5O2 | 8% |
| 4CyCyPh5O2 | 7% | 5CyCyPh5O2 | 6% |
| 5CyCyPh5O2 | 6% | 3PhPh5Ph2 | 3% |
| 3PhPh5Ph2 | 3% | 4PhPh5Ph2 | 3% |
| 4PhPh5Ph2 | 3% | 5PhPh1 | 4% |
| 5PhPh1 | 6% | Evaluation of dropping marks | B |
| 3CyCyPh1 | 1% | Evaluation of image sticking | B |
| Evaluation of dropping marks | B | | |
| Evaluation of image sticking | B | | |

| Example 24 | |
|---|---|
| $T_{NI}/°C$ | 85.0 |
| $\Delta n$ | 0.102 |
| no | 1.484 |
| $\epsilon_{//}$ | 3.3 |
| $\epsilon_\perp$ | 6.2 |
| $\Delta\epsilon$ | −3.0 |
| $\eta/mPa·s$ | 22.7 |
| $\gamma_1/mPa·s$ | 122 |
| $\gamma_1/\Delta n^2 \times 10^{-2}$ | 118 |
| 3CyCy2 | 16% |
| 3CyCy4 | 12% |
| 3CyCy5 | 5% |
| 3CyPhO1 | 5% |
| 2CyPh5O2 | 12% |
| 2CyPhPh5O2 | 9% |
| 3CyPhPh5O2 | 9% |
| 3CyCyPh5O3 | 6% |
| 4CyCyPh5O2 | 8% |
| 5CyCyPh5O2 | 6% |
| 3PhPh5Ph2 | 3% |
| 4PhPh5Ph2 | 3% |
| 5PhPh1 | 3% |
| 3CyCyPh1 | 3% |
| Evaluation of dropping marks | B |
| Evaluation of image sticking | B |

Examples 25 to 27

Liquid crystal compositions having compositions described below were prepared, and physical property values thereof were measured. The results are shown in a table below.

A VA liquid crystal display device was manufactured by same method as in Example 1 using the liquid crystal composition of each of Examples 25 and 27 and evaluated with respect to image sticking and dropping marks. The evaluation showed excellent results as shown in the table below.

TABLE 10

| | Example 25 | | Example 26 |
|---|---|---|---|
| $T_{NI}/°C$ | 75.6 | $T_{NI}/°C$ | 81.1 |
| $\Delta n$ | 0.104 | $\Delta n$ | 0.105 |
| no | 1.484 | no | 1.484 |
| $\epsilon_{//}$ | 3.3 | $\epsilon_{//}$ | 3.3 |
| $\epsilon_{\perp}$ | 6.1 | $\epsilon_{\perp}$ | 6.1 |
| $\Delta\epsilon$ | −2.8 | $\Delta\epsilon$ | −2.8 |
| $\eta$/mPa·s | 20.2 | $\eta$/mPa·s | 20.8 |
| $\gamma_1$/mPa·s | 117 | $\gamma_1$/mPa·s | 119 |
| $\gamma_1/\Delta n^2 \times 10^{-2}$ | 107 | $\gamma_1/\Delta n^2 \times 10^{-2}$ | 107 |
| 3CyCy2 | 25% | 3CyCy2 | 25% |
| 3CyCy4 | 10% | 3CyCy4 | 10% |
| 3CyPhO1 | 4% | 3CyPhO1 | 4% |
| 2CyPh5O2 | 7% | 2CyPh5O2 | 12% |
| 3CyPh5O4 | 8% | 2CyPhPh5O2 | 5% |
| 2CyPhPh5O2 | 5% | 3CyPhPh5O2 | 6% |
| 3CyPhPh5O2 | 6% | 3CyCyPh5O3 | 7% |
| 3CyCyPh5O3 | 6% | 4CyCyPh5O2 | 8% |
| 4CyCyPh5O2 | 7% | 5CyCyPh5O2 | 7% |
| 5CyCyPh5O2 | 6% | 3PhPh5Ph2 | 8% |
| 3PhPh5Ph2 | 8% | 4PhPh5Ph2 | 8% |
| 4PhPh5Ph2 | 8% | Evaluation of dropping marks | B |
| Evaluation of dropping marks | B | Evaluation of image sticking | B |
| Evaluation of image sticking | B | | |

| | Example 27 |
|---|---|
| $T_{NI}/°C$ | 85.7 |
| $\Delta n$ | 0.105 |
| no | 1.484 |
| $\epsilon_{//}$ | 3.2 |
| $\epsilon_{\perp}$ | 6.1 |
| $\Delta\epsilon$ | −2.9 |
| $\eta$/mPa·s | 21.0 |
| $\gamma_1$/mPa·s | 92 |
| $\gamma_1/\Delta n^2 \times 10^{-2}$ | 82 |
| 3CyCy2 | 25% |
| 3CyCy4 | 12% |
| 2CyPh5O2 | 12% |
| 2CyPhPh5O2 | 5% |
| 3CyPhPh5O2 | 6% |
| 3CyCyPh5O3 | 7% |
| 4CyCyPh5O2 | 8% |
| 5CyCyPh5O2 | 7% |
| 3PhPh5Ph2 | 8% |
| 4PhPh5Ph2 | 8% |
| 3CyCyPh1 | 2% |
| Evaluation of dropping marks | B |
| Evaluation of image sticking | B |

Comparative Example 1

A liquid crystal composition having a composition described below was prepared, and physical property values thereof were measured. The results are shown in a table below.

Like in Example 1, a symbol written on the left and right side of a content represents an abbreviation of a compound.

[Chem. 16]

Comparative Example 1

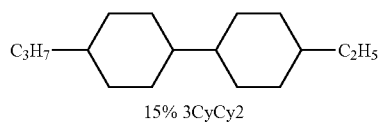

15% 3CyCy2

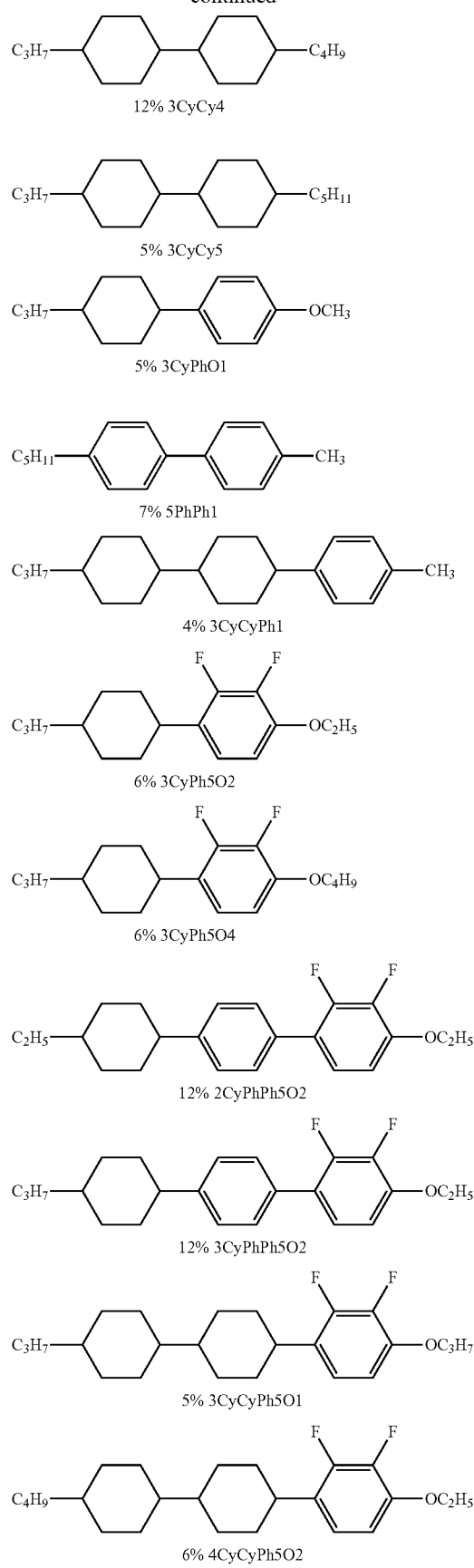

12% 3CyCy4

5% 3CyCy5

5% 3CyPhO1

7% 5PhPh1

4% 3CyCyPh1

6% 3CyPh5O2

6% 3CyPh5O4

12% 2CyPhPh5O2

12% 3CyPhPh5O2

5% 3CyCyPh5O1

6% 4CyCyPh5O2

-continued

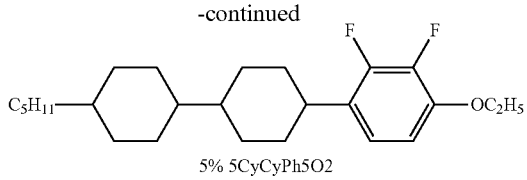

5% 5CyCyPh5O2

TABLE 11

| | |
|---|---|
| $T_{NI}/°C.$ | 81.4 |
| $\Delta n$ | 0.101 |
| no | 1.484 |
| $\epsilon_{//}$ | 3.23 |
| $\epsilon_\perp$ | 6.09 |
| $\Delta\epsilon$ | -2.86 |
| $\eta/mPa \cdot s$ | 22.6 |
| $\gamma_1/mPa \cdot s$ | 122 |
| $\gamma_1/\Delta n^2 \times 10^{-2}$ | 120 |
| Evaluation of dropping marks | D |
| Evaluation of image sticking | D |

A VA liquid crystal display device was formed by the same method as in Example 1 using the liquid crystal composition of Comparative Example 1, and image sticking and dropping marks were measured by the above-described methods. The measurement showed results inferior to the liquid crystal composition described in Example 1.

Comparative Examples 2 and 3

Liquid crystal compositions having compositions described below were prepared, and physical property values thereof were measured. The results are shown in a table below.

A VA liquid crystal display device was manufactured by same method as in Example 1 using the liquid crystal composition of each of Comparative Examples 2 and 3 and evaluated with respect to image sticking and dropping marks. The evaluation showed results inferior to the liquid crystal compositions described in the examples as shown in the table below.

TABLE 12

| | Comparative Example 2 | | Comparative Example 3 | |
|---|---|---|---|---|
| $T_{NI}/°C.$ | 74.4 | $T_{NI}/°C.$ | 85.0 | |
| $\Delta n$ | 0.102 | $\Delta n$ | 0.100 | |
| no | 1.484 | no | 1.484 | |
| $\epsilon_{//}$ | 3.23 | $\epsilon_{//}$ | 3.21 | |
| $\epsilon_\perp$ | 6.11 | $\epsilon_\perp$ | 6.11 | |
| $\Delta\epsilon$ | -2.87 | $\Delta\epsilon$ | -2.91 | |
| $\eta/mPa \cdot s$ | 21.9 | $\eta/mPa \cdot s$ | 22.7 | |
| $\gamma_1/mPa \cdot s$ | 117 | $\gamma_1/mPa \cdot s$ | 123 | |
| $\gamma_1/\Delta n^2 \times 10^{-2}$ | 113 | $\gamma_1/\Delta n^2 \times 10^{-2}$ | 123 | |
| 3CyCy2 | 18% | 3CyCy2 | 15% | |
| 3CyCy4 | 12% | 3CyCy4 | 12% | |
| 3CyCy5 | 5% | 3CyCy5 | 5% | |
| 2CyPh5O2 | 6% | 3CyPh5O1 | 5% | |
| 3CyPh5O4 | 7% | 2CyPh5O2 | 6% | |
| 2CyPhPh5O2 | 12% | 3CyPh5O4 | 6% | |
| 3CyPhPh5O2 | 12% | 2CyPhPh5O2 | 12% | |
| 3CyCyPh5O3 | 5% | 3CyPhPh5O2 | 12% | |
| 4CyCyPh5O2 | 6% | 3CyCyPh5O3 | 5% | |
| 5CyCyPh5O2 | 5% | 4CyCyPh5O2 | 6% | |
| 5PhPh1 | 12% | 5CyCyPh5O2 | 5% | |
| Evaluation of dropping marks | D | 5PhPh1 | 5% | |
| | | 3CyCyPh1 | 6% | |

TABLE 12-continued

| | Comparative Example 2 | | Comparative Example 3 | |
|---|---|---|---|---|
| Evaluation of image sticking | D | Evaluation of dropping marks | D | |
| | | Evaluation of image sticking | D | |

Comparative Examples 4 to 6

Liquid crystal compositions having compositions described below were prepared, and physical property values thereof were measured. The results are shown in a table below.

A VA liquid crystal display device was manufactured by same method as in Example 1 using the liquid crystal composition of each of Comparative Examples 4 to 6 and evaluated with respect to image sticking and dropping marks. The evaluation showed results inferior to the liquid crystal compositions described in the examples as shown in the table below.

TABLE 13

| | Comparative Example 4 | | Comparative Example 5 | |
|---|---|---|---|---|
| $T_{NI}/°C.$ | 77.5 | $T_{NI}/°C.$ | 80.8 | |
| $\Delta n$ | 0.117 | $\Delta n$ | 0.114 | |
| no | 1.489 | no | 1.488 | |
| $\epsilon_{//}$ | 3.30 | $\epsilon_{//}$ | 3.29 | |
| $\epsilon_\perp$ | 5.79 | $\epsilon_\perp$ | 5.83 | |
| $\Delta\epsilon$ | -2.49 | $\Delta\epsilon$ | -2.54 | |
| $\eta/mPa \cdot s$ | 21.6 | $\eta/mPa \cdot s$ | 21.2 | |
| $\gamma_1/mPa \cdot s$ | 130 | $\gamma_1/mPa \cdot s$ | 128 | |
| $\gamma_1/\Delta n^2 \times 10^{-2}$ | 94 | $\gamma_1/\Delta n^2 \times 10^{-2}$ | 98 | |
| 3CyCy2 | 25% | 3CyCy2 | 25% | |
| 3CyCy4 | 6% | 3CyCy4 | 7% | |
| 3CyPhO1 | 4% | 3CyPhO1 | 6% | |
| 2CyPh5O2 | 10% | 2CyPh5O2 | 10% | |
| 2CyPhPh5O2 | 5% | 2CyPhPh5O2 | 5% | |
| 3CyPhPh5O2 | 6% | 3CyPhPh5O2 | 6% | |
| 3CyCyPh5O3 | 6% | 3CyCyPh5O3 | 6% | |
| 4CyCyPh5O2 | 7% | 4CyCyPh5O2 | 7% | |
| 5CyCyPh5O2 | 6% | 5CyCyPh5O2 | 6% | |
| 3PhPh5Ph2 | 10% | 3PhPh5Ph2 | 10% | |
| 4PhPh5Ph2 | 11% | 4PhPh5Ph2 | 11% | |
| 5PhPh1 | 4% | 3CyCyPh1 | 1% | |
| Evaluation of dropping marks | D | Evaluation of dropping marks | C | |
| Evaluation of image sticking | C | Evaluation of image sticking | C | |
| | Comparative Example 6 | | | |
| $T_{NI}/°C.$ | 85.6 | | | |
| $\Delta n$ | 0.115 | | | |
| no | 1.488 | | | |
| $\epsilon_{//}$ | 3.25 | | | |
| $\epsilon_\perp$ | 5.83 | | | |
| $\Delta\epsilon$ | -2.59 | | | |
| $\eta/mPa \cdot s$ | 21.8 | | | |
| $\gamma_1/mPa \cdot s$ | 131 | | | |
| $\gamma_1/\Delta n^2 \times 10^{-2}$ | 98 | | | |
| 3CyCy2 | 25% | | | |
| 3CyCy4 | 7% | | | |
| 3CyPhO1 | 3% | | | |
| 2CyPh5O2 | 10% | | | |
| 2CyPhPh5O2 | 5% | | | |
| 3CyPhPh5O2 | 6% | | | |
| 3CyCyPh5O3 | 6% | | | |
| 4CyCyPh5O2 | 7% | | | |
| 5CyCyPh5O2 | 6% | | | |
| 3PhPh5Ph2 | 10% | | | |
| 4PhPh5Ph2 | 11% | | | |
| 3CyCyPh1 | 4% | | | |

| TABLE 13-continued | |
| --- | --- |
| Evaluation of dropping marks | B/C |
| Evaluation of image sticking | C |

| TABLE 14-continued | |
| --- | --- |
| Evaluation of dropping marks | C |
| Evaluation of image sticking | C |

Comparative Examples 7 to 9

Liquid crystal compositions having compositions described below were prepared, and physical property values thereof were measured. The results are shown in a table below.

A VA liquid crystal display device was manufactured by same method as in Example 1 using the liquid crystal composition of each of Comparative Examples 7 to 9 and evaluated with respect to image sticking and dropping marks. The evaluation showed results inferior to the liquid crystal compositions described in the examples as shown in the table below.

Comparative Examples 10 to 12

Liquid crystal compositions having compositions described below were prepared, and physical property values thereof were measured. The results are shown in a table below.

A VA liquid crystal display device was manufactured by same method as in Example 1 using the liquid crystal composition of each of Comparative Examples 10 to 12 and evaluated with respect to image sticking and dropping marks. The evaluation showed results inferior to the liquid crystal compositions described in the examples as shown in the table below.

TABLE 14

| Comparative Example 7 | | Comparative Example 8 | |
| --- | --- | --- | --- |
| $T_{NI}/°C$ | 75.5 | $T_{NI}/°C$ | 80.7 |
| $\Delta n$ | 0.104 | $\Delta n$ | 0.104 |
| no | 1.485 | no | 1.485 |
| $\epsilon_{//}$ | 3.26 | $\epsilon_{//}$ | 3.22 |
| $\epsilon_{\perp}$ | 6.14 | $\epsilon_{\perp}$ | 6.10 |
| $\Delta\epsilon$ | −2.88 | $\Delta\epsilon$ | −2.88 |
| $\eta$/mPa·s | 22.5 | $\eta$/mPa·s | 22.3 |
| $\gamma_1$/mPa·s | 123 | $\gamma_1$/mPa·s | 122 |
| $\gamma_1/\Delta n^2 \times 10^{-2}$ | 114 | $\gamma_1/\Delta n^2 \times 10^{-2}$ | 113 |
| 3CyCy2 | 24% | 3CyCy2 | 24% |
| 3CyCy4 | 4% | 3CyCy4 | 4% |
| 3CyPh5O2 | 7% | 3CyPh5O2 | 7% |
| 3CyPh5O4 | 8% | 3CyPh5O4 | 8% |
| 2CyPhPh5O2 | 4% | 2CyPhPh5O2 | 5% |
| 3CyPhPh5O2 | 5% | 3CyPhPh5O2 | 6% |
| 3CyCyPh5O3 | 8% | 3CyCyPh5O3 | 7% |
| 4CyCyPh5O2 | 10% | 4CyCyPh5O2 | 9% |
| 5CyCyPh5O2 | 8% | 5CyCyPh5O2 | 7% |
| 3PhPh5Ph2 | 4% | 3PhPh5Ph2 | 4% |
| 4PhPh5Ph2 | 4% | 4PhPh5Ph2 | 4% |
| 5PhPh1 | 10% | 5PhPh1 | 7% |
| 3CyCyPh1 | 4% | 3CyCyPh1 | 8% |
| Evaluation of dropping marks | C | Evaluation of dropping marks | C |
| Evaluation of image sticking | C | Evaluation of image sticking | C |

| Comparative Example 9 | |
| --- | --- |
| $T_{NI}/°C$ | 85.8 |
| $\Delta n$ | 0.104 |
| no | 1.485 |
| $\epsilon_{//}$ | 3.21 |
| $\epsilon_{\perp}$ | 6.16 |
| $\Delta\epsilon$ | −2.95 |
| $\eta$/mPa·s | 22.4 |
| $\gamma_1$/mPa·s | 124 |
| $\gamma_1/\Delta n^2 \times 10^{-2}$ | 114 |
| 3CyCy2 | 24% |
| 3CyCy4 | 4% |
| 3CyPh5O2 | 7% |
| 3CyPh5O4 | 8% |
| 2CyPhPh5O2 | 6% |
| 3CyPhPh5O2 | 7% |
| 3CyCyPh5O3 | 7% |
| 4CyCyPh5O2 | 7% |
| 5CyCyPh5O2 | 7% |
| 3PhPh5Ph2 | 4% |
| 4PhPh5Ph2 | 4% |
| 5PhPh1 | 4% |
| 3CyCyPh1 | 11% |

TABLE 15

| Comparative Example 10 | | Comparative Example 11 | |
| --- | --- | --- | --- |
| $T_{NI}/°C$ | 73.6 | $T_{NI}/°C$ | 80.9 |
| $\Delta n$ | 0.099 | $\Delta n$ | 0.094 |
| no | 1.484 | no | 1.480 |
| $\epsilon_{//}$ | 3.21 | $\epsilon_{//}$ | 3.07 |
| $\epsilon_{\perp}$ | 5.36 | $\epsilon_{\perp}$ | 5.23 |
| $\Delta\epsilon$ | −2.15 | $\Delta\epsilon$ | −2.16 |
| $\eta$/mPa·s | 17.7 | $\eta$/mPa·s | 17.0 |
| $\gamma_1$/mPa·s | 104 | $\gamma_1$/mPa·s | 97 |
| $\gamma_1/\Delta n^2 \times 10^{-2}$ | 106 | $\gamma_1/\Delta n^2 \times 10^{-2}$ | 109 |
| 3CyCy2 | 20% | 3CyCy2 | 24% |
| 3CyCy4 | 12% | 3CyCy4 | 12% |
| 3CyCy5 | 7% | 3CyCy5 | 15% |
| 3CyPhO1 | 12% | 3CyPh5O2 | 5% |
| 3CyPh5O2 | 5% | 3CyPh5O4 | 5% |
| 3CyPh5O4 | 5% | 2CyPhPh5O2 | 11% |
| 2CyPhPh5O2 | 11% | 3CyPhPh5O2 | 11% |
| 3CyPhPh5O2 | 11% | 3CyCyPh5O3 | 3% |
| 3CyCyPh5O3 | 3% | 4CyCyPh5O2 | 3% |
| 4CyCyPh5O2 | 3% | 5CyCyPh5O2 | 3% |
| 5CyCyPh5O2 | 3% | 3PhPh5Ph2 | 4% |
| 3PhPh5Ph2 | 4% | 4PhPh5Ph2 | 4% |
| 4PhPh5Ph2 | 4% | Evaluation of dropping marks | B/C |
| Evaluation of dropping marks | B/C | Evaluation of image sticking | C |
| Evaluation of image sticking | C | | |

| Comparative Example 12 | |
| --- | --- |
| $T_{NI}/°C$ | 84.7 |
| $\Delta n$ | 0.085 |
| no | 1.477 |
| $\epsilon_{//}$ | 3.00 |
| $\epsilon_{\perp}$ | 5.13 |
| $\Delta\epsilon$ | −2.13 |
| $\eta$/mPa·s | 17.5 |
| $\gamma_1$/mPa·s | 98 |
| $\gamma_1/\Delta n^2 \times 10^{-2}$ | 136 |
| 3CyCy2 | 21% |
| 3CyCy4 | 15% |
| 3CyCy5 | 15% |
| 3CyPh5O2 | 5% |
| 3CyPh5O4 | 5% |
| 2CyPhPh5O2 | 4% |
| 3CyPhPh5O2 | 5% |
| 3CyCyPh5O3 | 7% |
| 4CyCyPh5O2 | 8% |
| 5CyCyPh5O2 | 7% |
| 3PhPh5Ph2 | 4% |
| 4PhPh5Ph2 | 4% |

| TABLE 15-continued | |
|---|---|
| Evaluation of dropping marks | C |
| Evaluation of image sticking | C |

Comparative Examples 13 to 15

Liquid crystal compositions having compositions described below were prepared, and physical property values thereof were measured. The results are shown in a table below.

A VA liquid crystal display device was manufactured by same method as in Example 1 using the liquid crystal composition of each of Comparative Examples 13 to 15 and evaluated with respect to image sticking and dropping marks. The evaluation showed results inferior to the liquid crystal compositions described in the examples as shown in the table below.

TABLE 16

| Comparative Example 13 | | Comparative Example 14 | |
|---|---|---|---|
| $T_{NI}/°C.$ | 77.1 | $T_{NI}/°C.$ | 80.8 |
| $\Delta n$ | 0.109 | $\Delta n$ | 0.108 |
| no | 1.489 | no | 1.488 |
| $\epsilon_{//}$ | 3.18 | $\epsilon_{//}$ | 3.18 |
| $\epsilon_\perp$ | 5.29 | $\epsilon_\perp$ | 5.38 |
| $\Delta\epsilon$ | −2.10 | $\Delta\epsilon$ | −2.20 |
| $\eta$/mPa·s | 21.6 | $\eta$/mPa·s | 22.1 |
| $\gamma_1$/mPa·s | 130 | $\gamma_1$/mPa·s | 133 |
| $\gamma_1/\Delta n^2 \times 10^{-2}$ | 109 | $\gamma_1/\Delta n^2 \times 10^{-2}$ | 114 |
| 3CyCy2 | 24% | 3CyCy2 | 24% |
| 3CyCy4 | 7% | 3CyCy4 | 7% |
| 3CyPhO1 | 5% | 3CyPhO1 | 5% |
| 2CyPh5O2 | 2% | 2CyPh5O2 | 2% |
| 3CyPh5O4 | 2% | 3CyPh5O4 | 2% |
| 2CyPhPh5O2 | 8% | 2CyPhPh5O2 | 8% |
| 3CyPhPh5O2 | 8% | 3CyPhPh5O2 | 8% |
| 3CyCyPh5O3 | 7% | 3CyCyPh5O3 | 8% |
| 4CyCyPh5O2 | 9% | 4CyCyPh5O2 | 8% |
| 5CyCyPh5O2 | 7% | 5CyCyPh5O2 | 8% |
| 3PhPh5Ph2 | 4% | 3PhPh5Ph2 | 4% |
| 4PhPh5Ph2 | 4% | 4PhPh5Ph2 | 4% |
| 5PhPh1 | 13% | 5PhPh1 | 11% |
| Evaluation of dropping marks | D | 3CyCyPh1 | 1% |
| Evaluation of image sticking | C | Evaluation of dropping marks | D |
| | | Evaluation of image sticking | C |

| Comparative Example 15 | |
|---|---|
| $T_{NI}/°C.$ | 86.3 |
| $\Delta n$ | 0.107 |
| no | 1.487 |
| $\epsilon_{//}$ | 3.15 |
| $\epsilon_\perp$ | 5.42 |
| $\Delta\epsilon$ | −2.27 |
| $\eta$/mPa·s | 22.3 |
| $\gamma_1$/mPa·s | 134 |
| $\gamma_1/\Delta n^2 \times 10^{-2}$ | 118 |
| 3CyCy2 | 24% |
| 3CyCy4 | 7% |
| 3CyPhO1 | 5% |
| 2CyPh5O2 | 2% |
| 3CyPh5O4 | 2% |
| 2CyPhPh5O2 | 8% |
| 3CyPhPh5O2 | 8% |
| 3CyCyPh5O3 | 8% |
| 4CyCyPh5O2 | 8% |
| 5CyCyPh5O2 | 8% |
| 3PhPh5Ph2 | 4% |
| 4PhPh5Ph2 | 4% |

| TABLE 16-continued | |
|---|---|
| 5PhPh1 | 8% |
| 3CyCyPh1 | 4% |
| Evaluation of dropping marks | C |
| Evaluation of image sticking | C |

Comparative Examples 16 to 18

Liquid crystal compositions having compositions described below were prepared, and physical property values thereof were measured. The results are shown in a table below.

A VA liquid crystal display device was manufactured by same method as in Example 1 using the liquid crystal composition of each of Comparative Examples 16 to 18 and evaluated with respect to image sticking and dropping marks. The evaluation showed results inferior to the liquid crystal compositions described in the examples as shown in the table below.

TABLE 17

| Comparative Example 16 | | Comparative Example 17 | |
|---|---|---|---|
| $T_{NI}/°C.$ | 74.7 | $T_{NI}/°C.$ | 74.7 |
| $\Delta n$ | 0.104 | $\Delta n$ | 0.104 |
| no | 1.483 | no | 1.483 |
| $\epsilon_{//}$ | 3.38 | $\epsilon_{//}$ | 3.38 |
| $\epsilon_\perp$ | 6.85 | $\epsilon_\perp$ | 6.85 |
| $\Delta\epsilon$ | −3.47 | $\Delta\epsilon$ | −3.47 |
| $\eta$/mPa·s | 22.9 | $\eta$/mPa·s | 22.9 |
| $\gamma_1$/mPa·s | 121 | $\gamma_1$/mPa·s | 121 |
| $\gamma_1/\Delta n^2 \times 10^{-2}$ | 112 | $\gamma_1/\Delta n^2 \times 10^{-2}$ | 112 |
| 3CyCy2 | 12% | 3CyCy2 | 12% |
| 3CyCy4 | 12% | 3CyCy4 | 12% |
| 3CyCy5 | 5% | 3CyCy5 | 5% |
| 3CyPhO1 | 6% | 3CyPhO1 | 6% |
| 2CyPh5O2 | 11% | 2CyPh5O2 | 11% |
| 3CyPh5O4 | 11% | 3CyPh5O4 | 11% |
| 2CyPhPh5O2 | 7% | 2CyPhPh5O2 | 7% |
| 3CyPhPh5O2 | 8% | 3CyPhPh5O2 | 8% |
| 3CyCyPh5O3 | 5% | 3CyCyPh5O3 | 5% |
| 4CyCyPh5O2 | 5% | 4CyCyPh5O2 | 5% |
| 5CyCyPh5O2 | 5% | 5CyCyPh5O2 | 5% |
| 3PhPh5Ph2 | 5% | 3PhPh5Ph2 | 5% |
| 4PhPh5Ph2 | 5% | 4PhPh5Ph2 | 5% |
| 3CyCyPh1 | 3% | 3CyCyPh1 | 3% |
| Evaluation of dropping marks | D | Evaluation of dropping marks | D |
| Evaluation of image sticking | D | Evaluation of image sticking | D |

| Comparative Example 18 | |
|---|---|
| $T_{NI}/°C.$ | 86.2 |
| $\Delta n$ | 0.102 |
| no | 1.480 |
| $\epsilon_{//}$ | 3.23 |
| $\epsilon_\perp$ | 6.73 |
| $\Delta\epsilon$ | −3.50 |
| $\eta$/mPa·s | 25.3 |
| $\gamma_1$/mPa·s | 127 |
| $\gamma_1/\Delta n^2 \times 10^{-2}$ | 123 |
| 3CyCy4 | 20% |
| 3CyCy5 | 15% |
| 2CyPh5O2 | 11% |
| 3CyPh5O4 | 11% |
| 2CyPhPh5O2 | 7% |
| 3CyPhPh5O2 | 8% |
| 3CyCyPh5O3 | 5% |
| 4CyCyPh5O2 | 5% |
| 5CyCyPh5O2 | 5% |
| 3PhPh5Ph2 | 4% |

TABLE 17-continued

| | |
|---|---|
| 4PhPh5Ph2 | 4% |
| 3CyCyPh1 | 5% |
| Evaluation of dropping marks | D |
| Evaluation of image sticking | D |

Comparative Examples 19 to 21

Liquid crystal compositions having compositions described below were prepared, and physical property values thereof were measured. The results are shown in a table below.

A VA liquid crystal display device was manufactured by same method as in Example 1 using the liquid crystal composition of each of Comparative Examples 19 to 21 and evaluated with respect to image sticking and dropping marks. The evaluation showed results inferior to the liquid crystal compositions described in the examples as shown in the table below.

TABLE 18

| Comparative Example 19 | | Comparative Example 20 | |
|---|---|---|---|
| $T_{NI}/°C.$ | 74.9 | $T_{NI}/°C.$ | 79.6 |
| $\Delta n$ | 0.103 | $\Delta n$ | 0.104 |
| no | 1.484 | no | 1.484 |
| $\epsilon_{//}$ | 3.18 | $\epsilon_{//}$ | 3.14 |
| $\epsilon_{\perp}$ | 5.52 | $\epsilon_{\perp}$ | 5.53 |
| $\Delta\epsilon$ | −2.34 | $\Delta\epsilon$ | −2.39 |
| $\eta/mPa·s$ | 18.4 | $\eta/mPa·s$ | 18.9 |
| $\gamma_1/mPa·s$ | 106 | $\gamma_1/mPa·s$ | 108 |
| $\gamma_1/\Delta n^2 \times 10^{-2}$ | 99 | $\gamma_1/\Delta n^2 \times 10^{-2}$ | 99 |
| 3CyCy2 | 20% | 3CyCy2 | 20% |
| 3CyCy4 | 12% | 3CyCy4 | 12% |
| 3CyCy5 | 5% | 3CyCy5 | 5% |
| 3CyPhO1 | 5% | 3CyPhO1 | 2% |
| 2CyPh5O2 | 7% | 2CyPh5O2 | 7% |
| 3CyPh5O4 | 8% | 3CyPh5O4 | 8% |
| 2CyPhPh5O2 | 6% | 2CyPhPh5O2 | 6% |
| 3CyPhPh5O2 | 6% | 3CyPhPh5O2 | 6% |
| 3CyCyPh5O3 | 4% | 3CyCyPh5O3 | 4% |
| 4CyCyPh5O2 | 4% | 4CyCyPh5O2 | 4% |
| 5CyCyPh5O2 | 4% | 5CyCyPh5O2 | 4% |
| 3PhPh5Ph2 | 7% | 3PhPh5Ph2 | 7% |
| 4PhPh5Ph2 | 8% | 4PhPh5Ph2 | 8% |
| 3CyCyPh1 | 4% | 3CyCyPh1 | 7% |
| Evaluation of dropping marks | C | Evaluation of dropping marks | C |
| Evaluation of image sticking | C | Evaluation of image sticking | C |

| Comparative Example 21 | |
|---|---|
| $T_{NI}/°C.$ | 85.4 |
| $\Delta n$ | 0.107 |
| no | 1.485 |
| $\epsilon_{//}$ | 3.11 |
| $\epsilon_{\perp}$ | 5.56 |
| $\Delta\epsilon$ | −2.46 |
| $\eta/mPa·s$ | 20.0 |
| $\gamma_1/mPa·s$ | 114 |
| $\gamma_1/\Delta n^2 \times 10^{-2}$ | 99 |
| 3CyCy2 | 18% |
| 3CyCy4 | 12% |
| 3CyCy5 | 5% |
| 2CyPh5O2 | 7% |
| 3CyPh5O4 | 8% |
| 2CyPhPh5O2 | 6% |
| 3CyPhPh5O2 | 6% |
| 3CyCyPh5O3 | 4% |
| 4CyCyPh5O2 | 4% |
| 5CyCyPh5O2 | 4% |

TABLE 18-continued

| | |
|---|---|
| 3PhPh5Ph2 | 7% |
| 4PhPh5Ph2 | 8% |
| 3CyCyPh1 | 11% |
| Evaluation of dropping marks | C |
| Evaluation of image sticking | C |

Comparative Example 22

A liquid crystal composition having a composition described below was prepared, and physical property values thereof were measured. The results are shown in a table below.

A VA liquid crystal display device was manufactured by same method as in Example 1 using the liquid crystal composition of Comparative Example 22 and evaluated with respect to image sticking and dropping marks. The evaluation showed results inferior to the liquid crystal compositions described in the examples as shown in the table below.

TABLE 19

| Comparative Example 22 | |
|---|---|
| $T_{NI}/°C.$ | 86.3 |
| $\Delta n$ | 0.105 |
| no | 1.486 |
| $\epsilon_{//}$ | 3.44 |
| $\epsilon_{\perp}$ | 6.86 |
| $\Delta\epsilon$ | −3.41 |
| $\eta/mPa·s$ | 26.4 |
| $\gamma_1/mPa·s$ | 149 |
| $\gamma_1/\Delta n^2 \times 10^{-2}$ | 135 |
| 3CyCy2 | 24% |
| 3CyPhO1 | 11% |
| 2CyPh5O2 | 10% |
| 2CyPhPh5O2 | 7% |
| 3CyPhPh5O2 | 9% |
| 3CyCyPh5O3 | 10% |
| 4CyCyPh5O2 | 10% |
| 5CyCyPh5O2 | 10% |
| 3PhPh5Ph2 | 4% |
| 4PhPh5Ph2 | 4% |
| 5PhPh1 | 1% |
| Evaluation of dropping marks | D |
| Evaluation of image sticking | D |

The results of these comparative examples reveal that the liquid crystal display device using the liquid crystal composition of the present invention causes little image sticking and dropping marks.

REFERENCE SIGNS LIST

1 polarizing plate
2 substrate
3 transparent electrode or transparent electrode with active element
4 alignment film
5 liquid crystal
11 gate electrode
12 anodized film
13 gate insulating film
14 transparent electrode
15 drain electrode
16 ohmic contact layer
17 semiconductor layer 18 protective film
19a source electrode 1
19b source electrode 2
100 substrate
101 protective layer

The invention claimed is:

1. A liquid crystal composition containing 30 to 50% by mass of a compound represented by general formula (I),

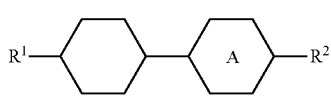

(in the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and A represents a 1,4-phenylene group or a trans-1,4-cyclohexylene group), and containing, as the compound represented by general formula (I), the following compound:

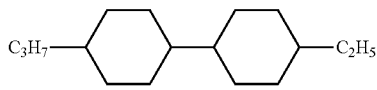

5 to 20% by mass of a compound represented by general formula (II-1),

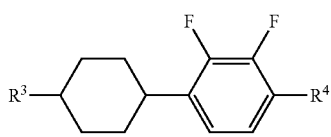

(in the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms), and 25 to 45% by mass of a compound represented by general formula (II-2),

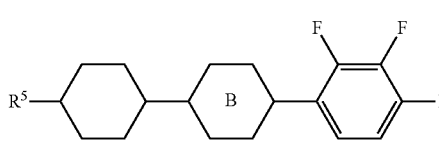

(in the formula, $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms, and B represents a 1,4-phenylene group which may be substituted by fluorine or a trans-1,4-cyclohexylene group), and the liquid crystal composition constituting a liquid crystal layer and further containing 5 to 20% by mass of a compound represented by general formula (III),

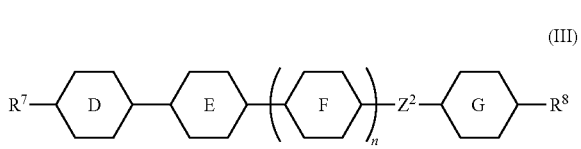

(in the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, D and G each independently represent a 1,4-phenylene group, E represents a 2,3-difluoro-1,4-phenylene group, $Z^2$ represents a single bond, and n represents 0), wherein a total content of the compounds represented by the general formula (I), the general formula (II-1), the general formula (II-2), and the general formula (III) is 95% to 100% by mass, and the composition does not contain a compound having a phenathrene skeleton.

2. The liquid crystal composition according to claim 1, wherein at least one each of compounds in which A in the general formula (I) represents a 1,4-phenylene group and a trans-1,4-cyclohexylene group, respectively, is contained.

3. The liquid crystal composition according to claim 1, wherein at least one each of compounds in which B in the general formula (II-2) represents a 1,4-phenylene group and a trans-1,4-cyclohexylene group, respectively, is contained.

4. The liquid crystal composition according to claim 3, wherein the compounds represented by the general formula (II-1), the general formula (II-2), and the general formula (III) are contained at 35% to 70% by mass.

5. The liquid crystal composition according to claim 1, wherein Z represented by an equation below is 13000 or less, $$Z = \gamma 1 / \Delta n^2$$

(in the equation, γ1 represents rotational viscosity, and Δn represents refractive index anisotropy), γ1 is 150 or less, and Δn is 0.08 to 0.13.

6. The liquid crystal composition according to claim 1, wherein an upper limit temperature of a nematic liquid crystal phase is 60° C. to 120° C., a lower limit temperature of the nematic liquid crystal phase is −20° C. or less, and a difference between the upper limit temperature and lower limit temperature of the nematic liquid crystal phase is 100° C. to 150° C.

7. The liquid crystal composition according to claim 1, wherein resistivity is $10^{12}$ (Ω·m) or more.

8. The liquid crystal composition according to claim 1, further containing a polymerizable compound represented by general formula (V),

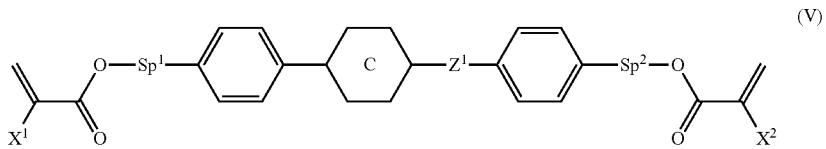

(in the formula, $X^1$ and $X^2$ each independently represent a hydrogen atom or a methyl group, $Sp^1$ and $Sp^2$ each independently represent a single bond, an alkylene group having 1 to 8 carbon atoms, or —O—$(CH_2)_s$— (wherein s represents an integer of 2 to 7, and an oxygen atom is bonded to an aromatic ring), $Z^1$ represents —$OCH_2$—, —$CH_2O$—, —COO—, —OOO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (wherein $Y^1$ and $Y^2$ each independently represent a fluorine atom or a hydrogen atom), —C≡C—, or a single bond, C represents a 1,4-phenylene group, a trans-1,4-cyclohexylene group, or a single bond, and any hydrogen atom of all 1,4-phenylene groups in the formula may be substituted by a fluorine atom).

9. The liquid crystal composition according to claim 8, wherein in the general formula (V), C represents a single bond, and $Z^1$ represents a single bond.

10. A liquid crystal display device comprising a first substrate provided with a common electrode composed of a transparent conductive material, a second substrate provided with a pixel electrode composed of a transparent conductive material and a thin-film transistor which controls the pixel electrode provided for each pixel, and a liquid crystal composition held between the first substrate and the second substrate, wherein liquid crystal molecules in the liquid crystal composition are aligned substantially perpendicularly to the substrates with no voltage applied, and the liquid crystal composition according to claim 1 is used as the liquid crystal composition.

11. The liquid crystal display device according to claim 10, wherein the thin-film transistor is an inversely staggered type.

\* \* \* \* \*